United States Patent
Fujita et al.

(10) Patent No.: US 6,728,598 B2
(45) Date of Patent: Apr. 27, 2004

(54) ARITHMETIC PROCESSING DEVICE, INTER-OBJECT COMMUNICATION METHOD, AND ROBOT

(75) Inventors: Masahiro Fujita, Saitama (JP); Takayuki Sakamoto, Kanagawa (JP); Kotaro Sabe, Tokyo (JP); Tsuyoshi Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/305,692

(22) Filed: Nov. 27, 2002

(65) Prior Publication Data

US 2003/0097202 A1 May 22, 2003

Related U.S. Application Data

(63) Continuation of application No. 09/482,473, filed on Jan. 12, 2000, now Pat. No. 6,505,097.

(30) Foreign Application Priority Data

Jan. 13, 1999 (JP) ............................................ 11-006491
Jan. 13, 1999 (JP) ............................................ 11-006757

(51) Int. Cl.⁷ ............................................. G06F 19/00
(52) U.S. Cl. ...................... 700/245; 700/248; 700/249; 700/250; 700/258; 700/260; 700/261; 700/262; 446/141; 446/142; 707/4; 379/88.03; 74/490.03
(58) Field of Search ................................ 700/245, 248, 700/249, 250, 258, 260, 261, 262, 94; 707/4; 74/490.03; 379/88.03; 446/141, 142; 1/268

(56) References Cited

U.S. PATENT DOCUMENTS

| 4,548,234 A | 10/1985 | Prenger .................... 706/13 |
| 5,448,561 A | 9/1995 | Kaiser et al. ............... 180/211 |
| 5,502,574 A | 3/1996 | Nakajima ............... 318/568.12 |
| 5,617,515 A | 4/1997 | MacLaren et al. .......... 340/436 |
| 6,115,045 A | * 9/2000 | Miyauchi .................... 345/418 |
| 6,267,317 B1 | 7/2001 | Beakes et al. .............. 250/253 |
| 2002/0107591 A1 | * 8/2002 | Gabai et al. ................ 700/94 |

FOREIGN PATENT DOCUMENTS

| JP | 11-058274 | * 2/1999 |
| WO | WO 97/14102 | * 4/1997 |

OTHER PUBLICATIONS

Shokri et al. An implementation model for time–triggered message–triggered object support mechanisms in CORBA-Compliant COTS platforms, 1998, IEEE, pp. 12–21.*
Lewandowski, Interaction and object modeling, 1996, Internet, pp. 1–36.*

(List continued on next page.)

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

An arithmetic processing device for inter-object data communication has an object manager for connecting objects so as to enable exchange of data between the objects, and a connection data supplying unit for supplying the object manager with connection data necessary for achieving the connection between the objects. Disclosed also are an inter-object communication method and a robot incorporating the arithmetic processing device. The robot may be designed to enable a user to replace parts thereof, thus changing the robot configuration. The robot preferably includes a part detection unit for detecting parts attached to the robot, and outputting a part detection result in accordance with the detection. An information storage unit stores information corresponding to the part detection result for each configuration obtained by replacement of the parts. A software changing unit revises robot-controlling software in correspondence with a changed configuration, based on a comparison of the part detection result with the information stored in the information storage unit. A controller controls general robot operations in accordance with the revised software.

6 Claims, 21 Drawing Sheets

OTHER PUBLICATIONS

Digital, Software product description, Basestar Classic for Open VMS Alpha, Version 3.4A, Jun. 1998, Internet pp. 1–6.

Fujita et al., Reconfigurable Physical Agents, 1998, Sony laboratory, pp. 54–61.

Fujita et al., Robot entertainment, 1996, Sony research.

Agah et al., Architectural and functional specifications for a robot kitten "robokoneko" to be controlled by a 10,000 evolved neural net module artificial brain, 1997, Internet.

Oreback, Components in intelligent robotics, no date, Internet, pp. 1–10.

Mock et al., On the coordination of autonomous systems, 1999, Internet/IEEE, pp. 1–5.

Bruyninckx et al., OROCOS: design and implementation of a robot control software framework, 2002, Internet, pp. 1–9.

* cited by examiner

FIG. 6

| STATES<br>INPUT | SLEEP | REST | WAKEUP | MOVE |
|---|---|---|---|---|
| NO DETECTION WITHIN 1 MINUTE | SLEEP | SLEEP | REST | WAKEUP |
| RED, MAGNITUDE < 10 FOR 10 SECONDS OR LONGER | REST | WAKEUP | MOVE | MOVE |
| RED, MAGNITUDE >= 10 | WAKEUP | MOVE | MOVE | MOVE |

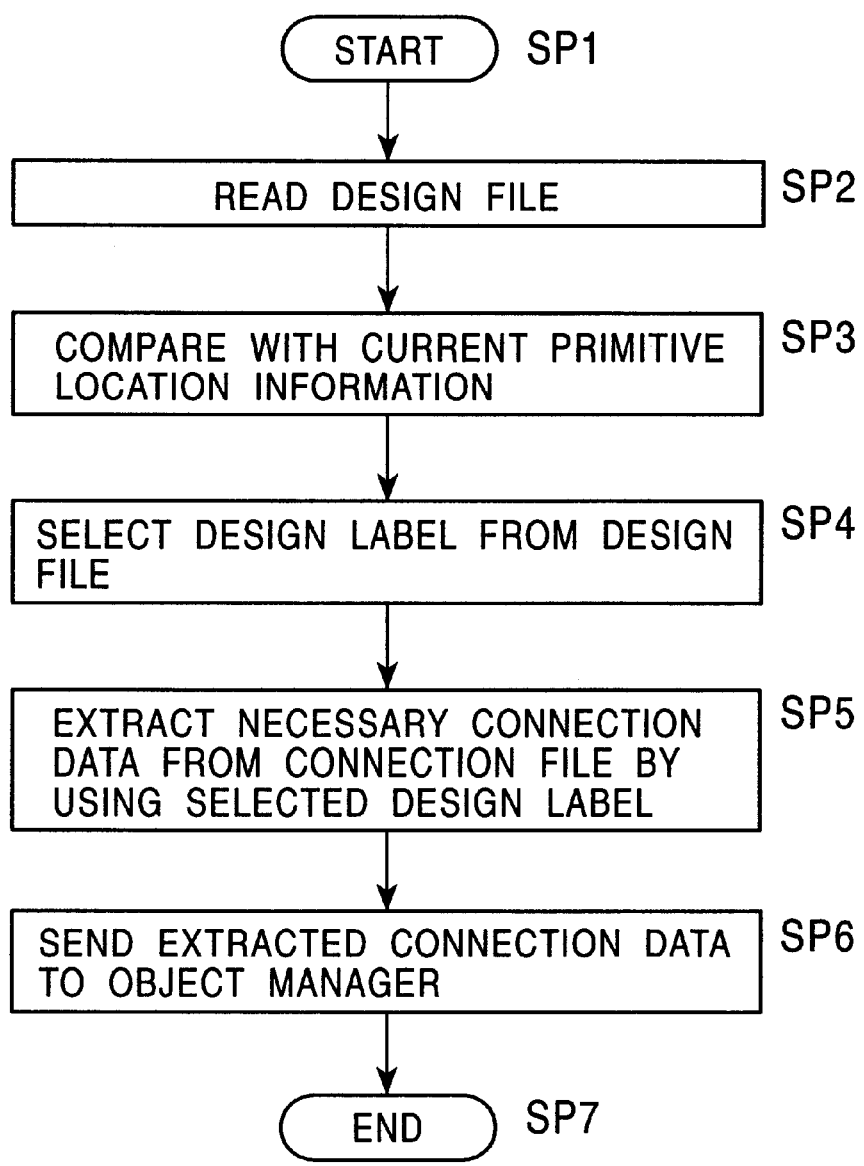

FIG. 9A

```
DRX- 4Legged {
    DRX Head;
    DRX RightFrontLeg;
    DRX LeftFrontLeg;
    DRX RightRearLeg;
    DRX LeftRearLeg;
}
DRX Wheel {
    DRX Head;
    DRX RightFrontLeg;
    DRX LeftFrontLeg;
    DRX RightRearWheel;
    DRX LeftRearWheel;
}
DRX Head {
    DRX CameraLink;
}
Virtual CameraLink {
    DRX CameraLink;
    Camera:
    Coordinate:/
}
DRX RightFrontLeg {
    Coordinate:/C1/C0-Joint;
    Coordinate:/C1/C0/C0-Joint;
    Coordinate:/C1/C0/C0/C0-Joint;
    Coordinate:/C1/C0/C0/C0/C0-Touchsensor;
}
DRX LeftFrontLeg {
    Coordinate:/C2/C0-Joint;
    Coordinate:/C2/C0/C0-Joint;
    Coordinate:/C2/C0/C0/C0-Joint;
    Coordinate:/C2/C0/C0/C0/C0-Touchsensor;
}
DRX RightRearLeg {
    Coordinate:/C3/C0-Joint;
    Coordinate:/C3/C0/C0-Joint;
    Coordinate:/C3/C0/C0/C0-Joint;
    Coordinate:/C3/C0/C0/C0/C0-Touchsensor;
}
DRX LeftRearLeg {
    Coordinate:/C4/C0-Joint;
    Coordinate:/C4/C0/C0-Joint;
    Coordinate:/C4/C0/C0/C0-Joint;
    Coordinate:/C4/C0/C0/C0/C0-Touchsensor;
}
DRX RightRearWheel {
    Coordinate:/C3/C0-wheel;
}
DRX LeftRearWheel {
    Coordinate:/C4/C0-wheel;
}
```

FIG. 9B

```
CPC Current Information {
        Coordinate:/C0/C0/-Joint;
        Coordinate:/C0/C0/C0-Joint;
        Coordinate:/C0/C0/C0/C0-Joint;
        Coordinate:/C0/C0/C0/C0/C0-Camera;
        Coordinate:/C1/C0/-Joint;
        Coordinate:/C1/C0/C0-Joint;
        Coordinate:/C1/C0/C0/C0-Joint;
        Coordinate:/C1/C0/C0/C0/C0-Touchsensor;
        Coordinate:/C2/C0/-Joint;
        Coordinate:/C2/C0/C0-Joint;
        Coordinate:/C2/C0/C0/C0-Joint;
        Coordinate:/C2/C0/C0/C0/C0-Touchsensor;
        Coordinate:/C3/C0/-Joint;
        Coordinate:/C3/C0/C0-Joint;
        Coordinate:/C3/C0/C0/C0-Joint;
        Coordinate:/C3/C0/C0/C0/C0-Touchsensor;
        Coordinate:/C4/C0/-Joint;
        Coordinate:/C4/C0/C0-Joint;
        Coordinate:/C4/C0/C0/C0-Joint;
        Coordinate:/C4/C0/C0/C0/C0-Touchsensor;
}
```

ARITHMETIC PROCESSING DEVICE, INTER-OBJECT COMMUNICATION METHOD, AND ROBOT

This application is a continuation of U.S. patent application Ser. No. 09/482,473, filed Jan. 12, 2000 now U.S. Pat. No. 6,505,097.

BACKGROUND OF THE INVENTION

1. Field of the Invention

The present invention relates to an arithmetic processing device, an inter-object communication method and to a robot, which are suitable for use in, for example, a pet-type robot.

2. Description of the Related Art

Hitherto, robots such as pet-type or "entertainment" robots have incorporated object-oriented software, so that various data are processed through inter-object communication. In pet-type robots, the software and hardware are designed to enable the robot to perform behavior or actions similar to those of a pet animal.

Conventional object-oriented software is generally designed based on explicit relationships between objects, so that the objects inevitably have large dependency on each other. One method to reduce mutual dependency of objects is to develop the software in accordance with a technique known as a "design pattern" or "observer pattern", as described in a text entitled DESIGN PATTERN FOR REUSE IN OBJECT ORIENTATION, by Erich Gamma, pp. 313–324. In accordance with the design pattern technique, objects are classified into a subject and observers, and the observers are registered in the subject. The objects are interconnected based on the registration, so that various notifications and data are sent from the observers to the subject.

The subject sequentially invokes designated methods (i.e., updating methods) to the registered objects to entrust the observers to process the data. According to the design pattern technique, therefore, the subject can be designed to have enhanced independence, without necessitating any coding for sending data to specific objects.

The design pattern technique, however, is still unsatisfactory from a view point of practical use in regard to the independency of the objects, because the technique is based on the registration of the observers in a specific subject, requiring descriptions of the objects to be formed prior to the registration.

Another method that has been proposed to enhance independency of software objects employs a visual tool formed in accordance with the above-noted design pattern technique. Details of this method are disclosed in a publication entitled GUIDANCE TO VISUALAGE C++, by JIP Object Technology Researchers' Association. In accordance with this visual tool-based method, source codes are automatically generated in accordance with object-connection instructions provided through the visual tool. A shortcoming of this technique, therefore, is that it requires a compiler in order to revise the software.

Still another method that has been proposed to enable inter-object communication uses a so-called "proxy", as disclosed in Japanese Patent Application Publication No. 10-28398. This method, however, does not make any contribution to the enhancement of independency of the objects.

Yet another approach hitherto proposed makes use of the naming service method of a client sever system as disclosed in Japanese Patent Application Publication No. 10-171465. This client server system incorporates a method which could be compared with the aforesaid observer pattern method and which decomposes a software architecture into elements. This method also is used in CORBA (Common Object Request Broker Architecture). However, sufficient object independency is not provided, because the technique requires the observers to designate a subject as in the case of the observer pattern method. In addition, re-compiling and re-linking processes are disadvantageously required.

OBJECTS AND SUMMARY OF THE INVENTION

Accordingly, it is an object of the present invention to provide an arithmetic processing device, as well as an inter-object communication method and a robot, that can enhance independency of objects over the known art.

It is another object of the invention to provide a robot having a configuration that is changeable by a user, which robot includes software that automatically detects a change in the configuration and revises internal robot-controlling software in accordance with the detected change.

A general object of the invention is to provide an improved entertainment robot.

To this end, according to a first aspect of the present invention, there is provided an arithmetic processing device for inter-object data communication, which includes: an object manager for connecting objects so as to enable exchange of data between the objects; and connection data supplying means (e.g., system software) for supplying the object manager with connection data necessary for achieving the connection between the objects.

The arithmetic processing device may be advantageously employed within a robot that has replaceable parts to enable alteration of the robot configuration. In this case, the overall actions of the robot are controlled by object-oriented software through inter-object data communication. When robot parts are changed, robot system software detects the change and supplies the object manager with the necessary connection data.

One benefit of the object manager and connection data supplying means of the arithmetic processing device and robot of the invention, is that they allow the designer to design each object without taking into consideration any specific mating object to which the object under design is to be connected. Various combinations or sets of connection information are given to the thus designed object so as to implement different connections, whereby the independency of each object can greatly be enhanced as compared with the known art.

In another aspect of the invention, there is provided a robot having a configuration that is changeable via replacement of parts thereof. This robot includes a part detection unit (e.g., including robot system software) for detecting parts attached to the robot, and outputting a part detection result in accordance with the detection. An information storage unit stores information corresponding to the part detection result for each configuration obtained by replacement of the parts. A software changing unit revises robot-controlling software in correspondence with a changed configuration, based on a comparison of the part detection result with the information stored in the information storage unit. A controller controls general robot operations in accordance with the revised software.

In yet another aspect of the invention, a method for processing data transmitted between a plurality of objects includes the steps of: defining a plurality of combinations of objects; providing specific information corresponding to each combination of objects; and generating, in accordance with the specific information, at least one control signal for application to each of the plurality of objects to manage the data transmitted between the plurality of objects.

The above and other objects, features and advantages of the present invention will become clear from the following description of the preferred embodiments when the same is read in conjunction with the accompanying drawings in which like reference numerals denote like elements and parts.

BRIEF DESCRIPTION OF THE DRAWINGS

FIG. 6 is a chart showing the relationship between inputs and states:

FIG. 8 is a flowchart illustrating design robot object processing procedure;

FIGS. 9A and 9B are listings of design file descriptions and connection information, respectively;

DETAILED DESCRIPTION OF THE PREFERRED EMBODIMENTS

The present invention will be described below in the context of an illustrative embodiment thereof, namely, an entertainment robot. While the invention has particular utility for this application, it is not limited thereto. The invention is also contemplated for use in other types of devices and robots employing object-oriented software.

The present invention recognizes that an entertainment or pet-type robot would become more versatile if its constituent parts, such as its limbs, were freely interchangeable by the user to implement a desired configuration of the robot. When such interchangeability is achieved, it is conceivable that software which conducts overall control of the robot action can be altered in accordance with the alteration of the robot configuration, through restructuring the objects.

Since the above-noted conventional object-oriented software is typically designed based on explicit relationships between objects, the objects have large dependency on one another. Consequently, revision of the software complying with versatile alteration of robot configuration cannot be successfully accomplished with such conventional software. This would undesirably lead to the necessity of exclusive software for each of the possible configurations. The above-discussed methods to reduce mutual dependency of objects all have certain drawbacks as previously noted, and would therefore prove to be inadequate if implemented in a robot with a versatile, changeable configuration.

I. Overall Configuration of Illustrative Embodiment

Figure 1A:
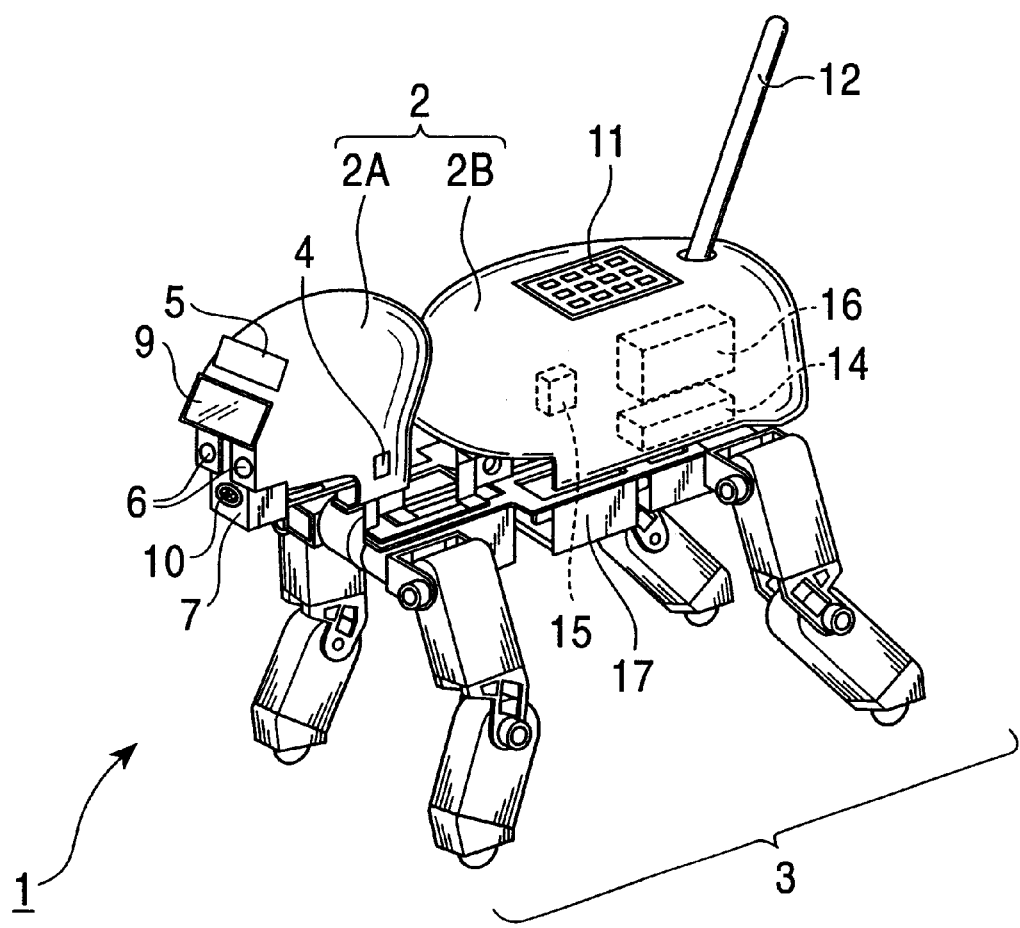
FIGS. 1A–1C are perspective views of robots embodying the present invention.

FIG. 1A is a perspective view of a robot embodying the present invention, specifically a so-called pet-type robot having a configuration simulating a dog and capable of walking by means of four legs. Robot 1 has a main part 2 and a moving unit 3 mounted on the main part 2. The main part 2 has a head 2A and a body 2B.

Head 2A has elements for receiving various types of information; these elements include microphone 4, touch sensor 5, three-dimensional television camera 6, and signal receiver 7 for receiving infrared remote control signals. Head 2A also has an image display unit 9 and a speaker 10 which output various types of information.

Body 2B has an operating portion 11 and an antenna 12 located at a position of a dog tail. The user can input instructions through the operating section II and the antenna 12. Body 2B also has a slot for receiving an IC card to enable, for example, updating software versions. Body 2B further has the following parts: a controller 15 which conducts overall control of actions by processing various types of information and instructions given through the head 2A and the operating section 11; a power supply unit for supplying electrical power to various parts; a communication unit 16 for sending and receiving various information via the antenna 12; and a battery 17 provided at a lower portion of body 2B.

In the embodiment of FIG. 1A, the moving unit 3 includes four legs, each having an actuator and an angle sensor arranged at a joint thereof. Moving unit 3 is connected to the main part 2 through a serial bus, to enable operation under the control of the main part 2, so that the robot can walk by means of four legs.

Two out of four legs of the moving unit 3, corresponding to rear legs of a dog, are replaceable, e.g., with another moving unit having wheels. (Alternatively, all four legs can be replaced by wheels or different leg types.) Thus, the robot 1 can have either a four-legged configuration in which it walks on four legs, or a wheeled configuration in which it moves by means of wheels, at the discretion of the user.

Figure 1B:
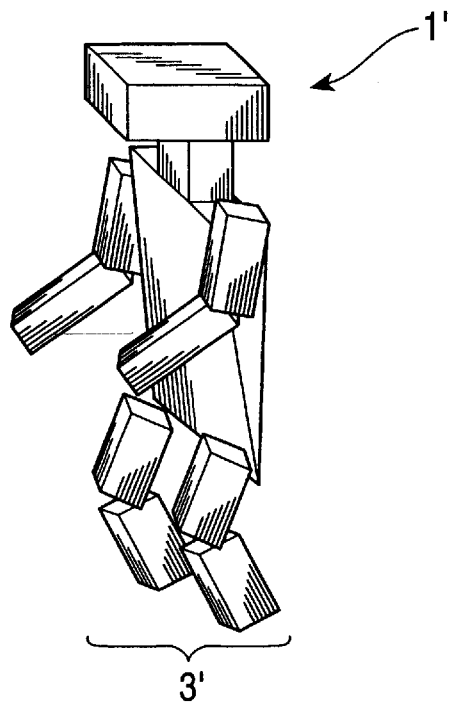
Figure 1C:
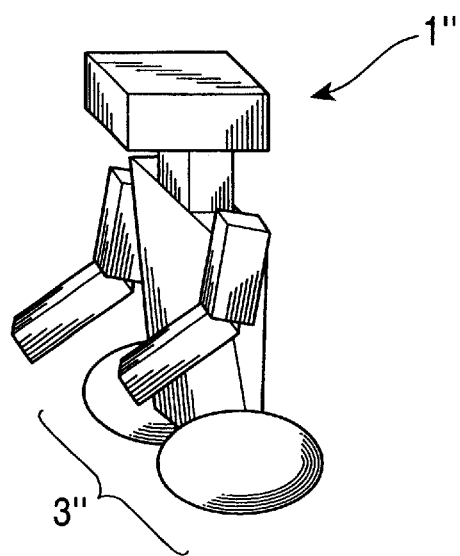

With reference to FIGS. 1B and 1C, the above-noted concept of a robot with a changeable configuration is illustrated. FIG. 1B is a perspective view of an entertainment robot 1' having similar internal circuitry and software as robot 1 of FIG. 1A. Legs 3' of robot 1' are replaceable with wheels 3" to form robot 1" with a changed configuration as seen in FIG. 1C. Software embedded within legs 3' communicates with software within controller 15 of the robot body 2B. Thus, controller 15 identifies the connected parts as legs by means of the software within legs 3' communicating self-identifying information. Likewise, when the legs 3' are replaced by wheels 3", software within the wheels sends self-identifying data to controller 15 to enable the overall robot controlling software in body 2B to be changed in conformity with the new physical configuration, as will be explained further below.

Figure 2:
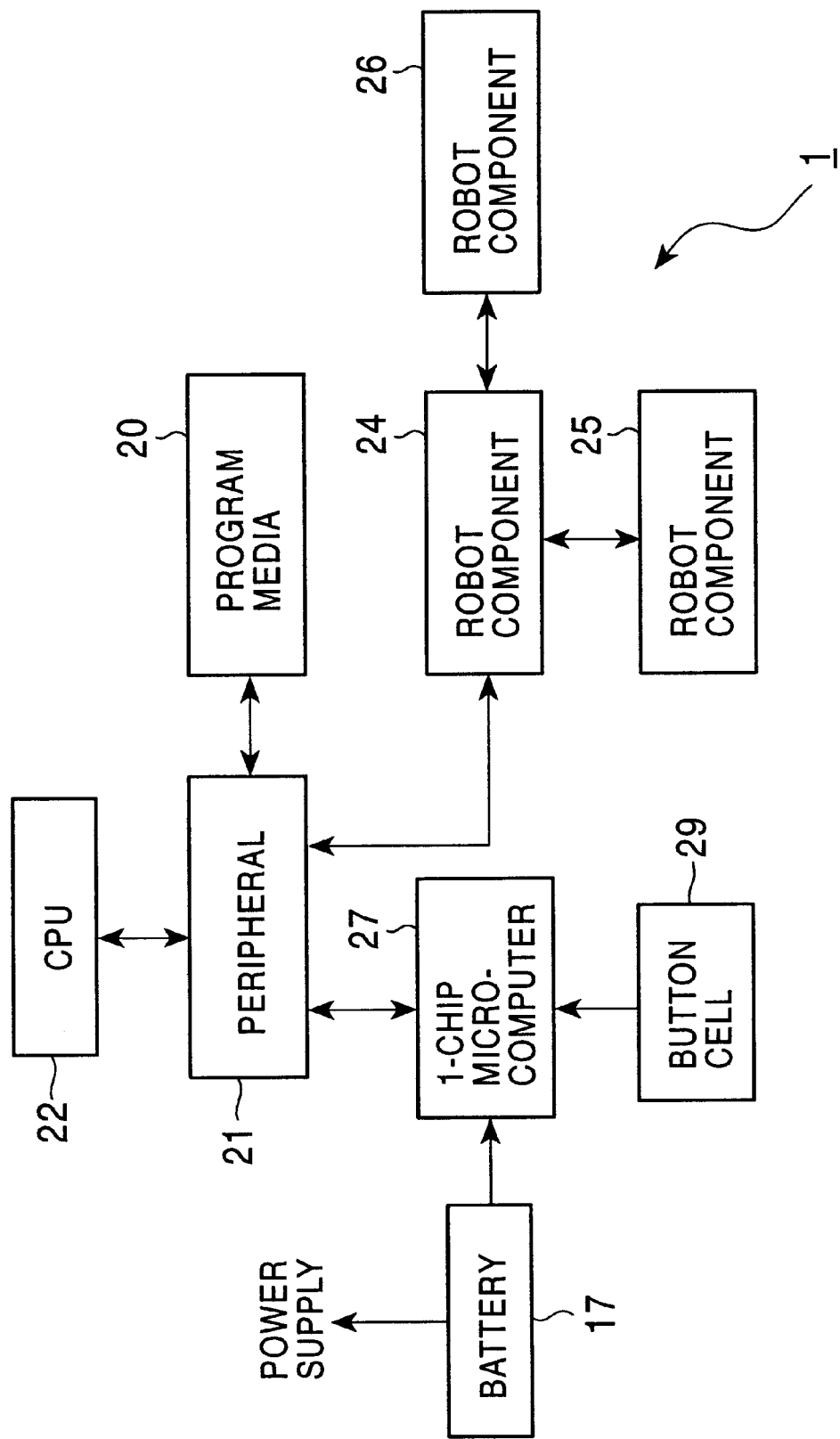
FIG. 2 is a block diagram of an exemplary configuration of the robot shown in FIG. 1A.

FIG. 2 is a block diagram showing an illustrative configuration of electronics within robot 1. A program medium 20 storing processing programs is connected through a peripheral 21 to a central processing unit 22 which executes processing operations in accordance with the programs. The central processing unit 22 is connected through the peripheral 21 also to robot components 24, 25 and 26 which are the actuators and sensors of the moving unit 3, as well as the television camera 6 and the operating section 11, so as to be able to conduct overall control of actions of the robot.

The processing unit 22 (also referred to herein as an arithmetic processing device) is connected through the peripheral 21 also to a power control 1-chip microcomputer 27 which serves as a power supply unit 14, and controls the operation of the microcomputer 27 so as to supply electrical power to all parts or components of the robot from the battery 17, whereas, in a power saving mode, from a button cell 29 in place of battery 17.

II. Software Architecture

Figure 3:
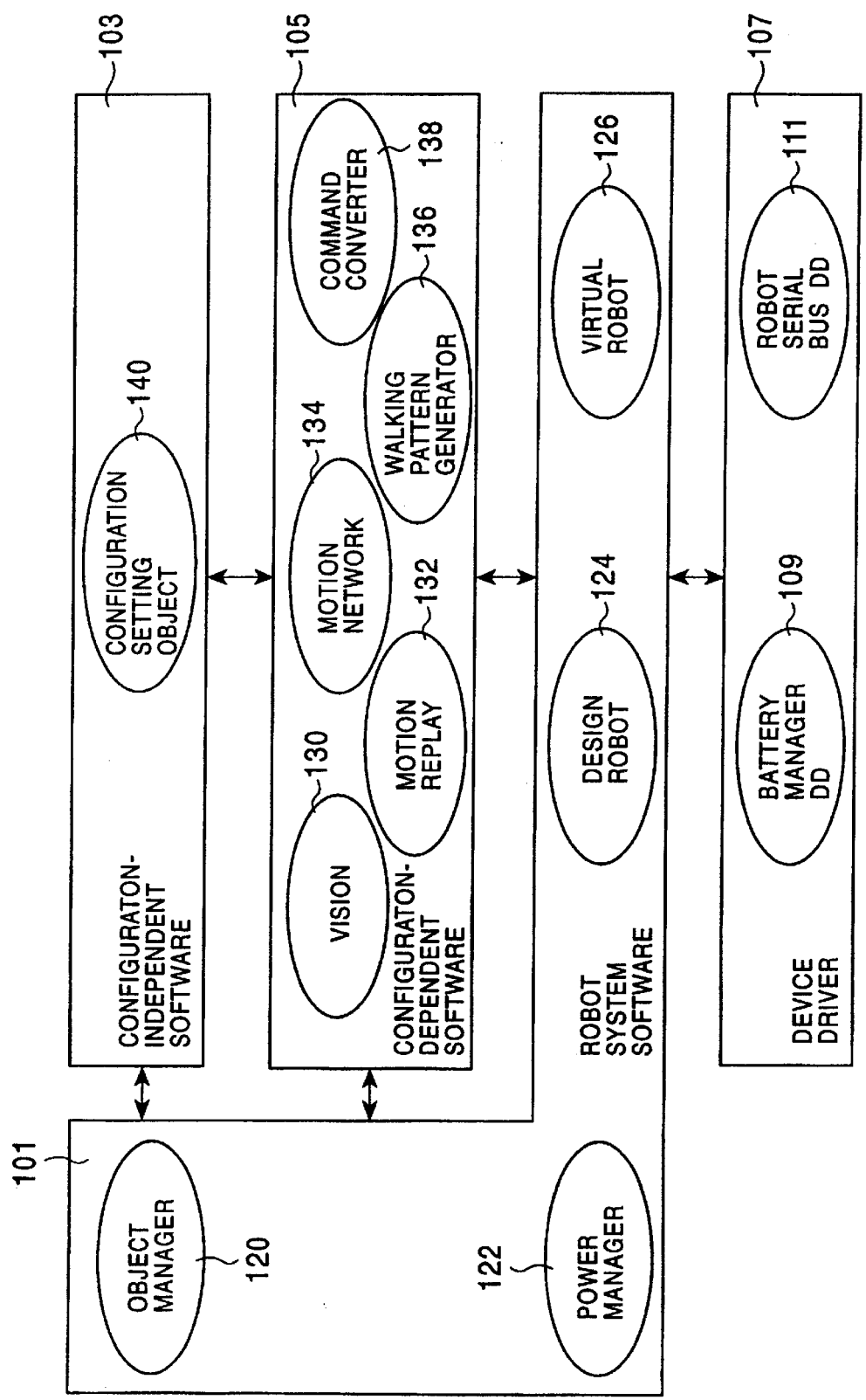
FIG. 3 is a schematic diagram illustrative of software for use on a legged robot.

Referring to FIG. 3, there is shown a layered software architecture that is used when the robot has the four-legged configuration. When legs are replaced by wheels, the software is modified slightly as will be described below in reference to FIG. 4. In both cases, the lowermost layer is a device driver layer 107 having various device drivers. The device drivers have software objects which exchange information with the sensors and actuators of the moving unit 3 and various robot components arranged on the head 2A, and which process this information.

The device drivers include a battery manager device driver 109 (referred to as a "battery manager DD") which communicates with the 1-chip microcomputer 27 of the power supply unit 14 so as to detect the power remaining in the battery 17 and to periodically inform upper-layer robot system software 101 of the detection result. The battery manager DD 109 also serves to administrate clocks to be supplied to the central processing unit 22 and other components, so as to reduce the clock frequency when instructed by the robot system software, while suspending operations of devices that are not required to operate, thereby reducing overall electrical power consumption.

A robot serial bus device driver 111 communicates with master controlling hardware of the serial bus arranged on the main part 2, so as to receive various information such as information from the sensor of the moving unit 3 connected to the serial bus. Serial bus DD 111 delivers the information to commanding robot system software 101, while sending actuator control data, audio signals and so forth generated by the robot system software 101 to various devices. Serial bus DD 111 also detects any change, e.g., addition or deletion, of devices connected to the serial bus, when the system is started up. Serial bus DD 111 retrieves information peculiar to the changed devices and supplies the robot system software with information indicative of the current configuration of the robot 1.

The robot system software 101 is arranged on a layer above the device driver layer 107. Robot system software 101 is composed of objects such as a virtual robot 126, design robot 124, power manager 122, object manager 120, and so on.

The virtual robot 126 exchanges data with the robot serial bus DD 111, while converting the data from a format peculiar to each device to a robot-general format. For instance, motor control data has a format peculiar to the motor control device, e.g., a 10-bit signal obtained through an analog-to-digital conversion of a potentiometer serving as a sensor. The virtual robot transforms this data into a general format used in the robot 1, e.g., data in which the least significant bit indicates 0.001 degree. In addition to the sending and receiving of data through the described format transformation, the virtual robot also serves to supply the commanding software 101 with data such as image data acquired through the television camera 6.

The virtual robot also receives from the robot serial bus DD information indicative of the current configuration of the robot 1 and assembles this information. Thus, the virtual robot can administrate CPC (Configurable Physical Component) connection information (also simply referred to herein interchangeably as "connection information" or "CPC tree") which indicates the types of the robot components and the sequence of connection of such components currently constituting the robot 1. The virtual robot 126 delivers the connection information to the design robot 124. Any change in the connection of the devices to the serial bus is communicated by the robot serial bus DD of the device driver to the virtual robot which in turn delivers the changed connection information to the design robot.

Upon receipt of the connection information from the virtual robot, the design robot sequentially compares the connection information with various combinations or types of connection template information, and selects a template which best matches the current configuration of the robot 1. (The combinations of connection template information are assembled as design data in a design file.) Further, design robot 124 supplies object manager 120 with an instruction to update, in accordance with the selected template, commanding configuration-dependent software to configuration-dependent software that matches with the current robot configuration.

The object manager 120 operates in accordance with the instruction given by the design robot, so as to update configuration-dependent software 105 to a version which best suits the current robot configuration, by using objects and object connection information communicated to the object manager from the design robot. More specifically, object manager 120 performs suspension of operation, dismissal of inter-object communication connection, destruction of object and releasing of resources, on all the objects constituting the current configuration-dependent software. Object manager 120 further performs operations such as loading of necessary objects, initialization of such objects, building up of inter-object communication connection and starting up of the objects.

A power manager 122 communicates with the battery manager DD 109 and operates in accordance with instructions given by the commanding software, i.e., configuration-independent software 103 or the configuration-dependent software 105, so as to instruct the battery manager DD to change-over the clock or to cease operations of the objects.

The robot system software is commanded by the configuration-dependent software 105 which in turn is commanded by the configuration-independent software 103. The configuration-dependent software is revised depending on the configuration of the robot 1, while the configuration-independent software is robot commanding software which is fixed regardless of the robot configuration. Thus, the configuration-dependent software involves various objects that are dependent on the configuration of the robot. In the illustrative embodiment, software suitable for the four-legged configuration or the wheeled configuration can be readily provided by revising the configuration-dependent software 105.

More specifically, for the four-legged configuration, the configuration-dependent software 105 (see FIG. 3) has objects relating to the moving unit 3, including a command converter object 138, a motion network object 134, a motion replay object 132, a walking pattern generator object 136, a vision object 130, and so forth. Command converter object 138 converts a configuration-independent command from the configuration-independent software into a command which suits the current configuration of robot 1. Commands given by the configuration-independent software 103 include "Sleep", "Rest", "Wakeup" and "Move". When a command is received from software 103, the command converter object 138 converts it into a command which indicates the "Sleeping", "Sitting", "Standing" or "Walking" state or posture of the robot of the four-legged configuration.

Figure 5:
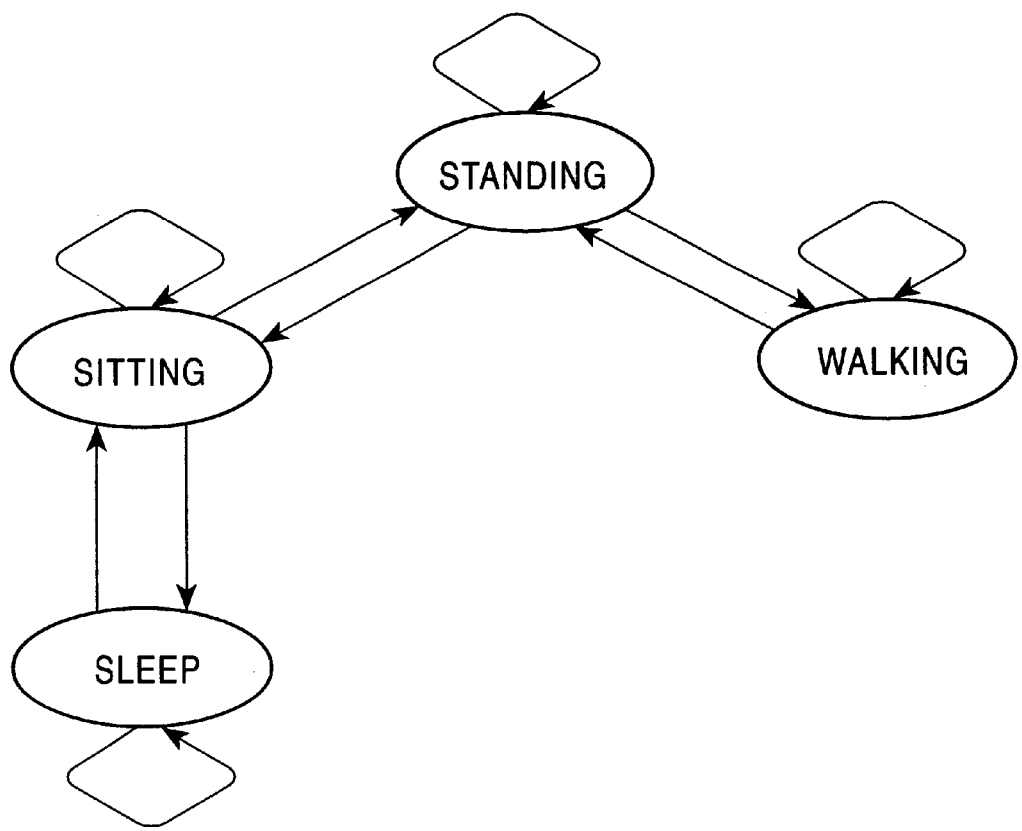
FIG. 5 is a transitional state diagram showing changes in the posture of the legged robot.

Referring now to the transition diagram shown in FIG. 5, in accordance with the posture command given by the command converter object 138 (FIG. 3), the motion network object 134 operates to start methods (entries) of objects in accordance with the arrows shown in the transition diagram. For instance, when the "Walking" command is received while the robot is "Sleeping", motion network object 134 sequentially starts up (initiates) entries of motion replay object 132, so that the posture of the robot is changed sequentially from "Sleeping" to "Sitting", "Standing" and then to "Walking". In this case, when the final state of "Walking" is reached, motion network object 134 starts the entry of the walking pattern generator object 136 which corresponds to the loop indicative of the walking state.

In response to the motion network object commencing an object entry, the motion replay object 132 outputs joint angle command values for changing the posture corresponding to the command. Practically, the motion replay object holds registered discrete joint angle command values as key data, and outputs a series of angle command values through an interpolation processing using the key data. The walking pattern generator object 136 computes and outputs the joint angle command values such that the robot moves in a direction designated by the configuration-independent software.

The vision object is, for example, an image processing object. This object receives, from the virtual robot object, the image data acquired through the television camera 6, and processes the received image data. For instance, the vision may differentiate an object of a specific color, e.g., red, and detects and outputs the position and apparent size of the red object with respect to the robot's position.

Figure 4:
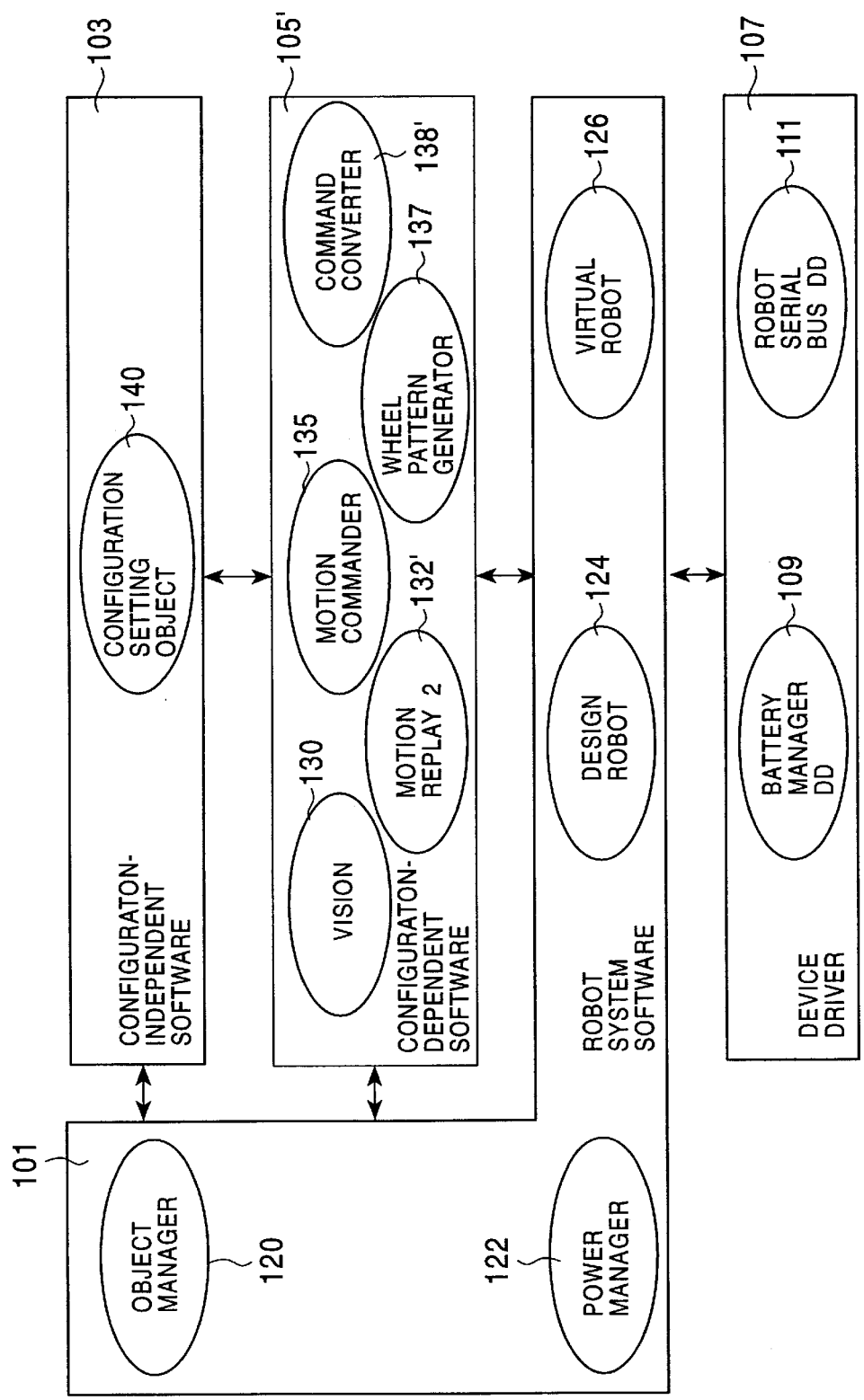
FIG. 4 is a schematic diagram illustrative of software for use on a wheeled robot.

FIG. 4 is a block diagram illustrating software within body 2B when a wheeled configuration is detected (such as that depicted in FIG. 1C). In this case, the configuration-dependent software 105' contains objects which relate to the wheeled moving unit 3". These objects include a vision object 130 that may be the same as in the four-legged configuration case, as well as other objects peculiar to the wheeled configuration, such as a command converter object 138', a motion commander object 135, a motion replay 2 object 132', and a wheel pattern generator object 137.

As in the case of command converter object 138 for the four-legged configuration, command converter object 138' for the wheeled configuration converts a configuration-independent command given by the configuration-independent software into a command that suits the current configuration of the robot 1. In this case, since the robot 1 has the wheeled configuration, the command converter object converts "Sleep", "Rest", "Wakeup" and "Move" commands into "Sleeping", "Rest", "Ready" and "Go" commands, respectively.

Upon receipt of the output from command converter object 138', the motion commander object 135 generates a joint angle (e.g., as in a hip joint) command value relating to a wheel control command. More specifically, the motion commander object 135 sets the joint angle command value to "neutral". The "Neutral" command value does not effect driving and control of the motor. Consequently, the forelegs or arms of the moving unit are held suspended upright, while the wheels are held out of operation.

In contrast, when the "Rest" command is received, the motion commander object generates joint angle command values so that the robot kneels down with its forelegs bent at 90° at their elbows, while the head 2A is set upright forward. The wheels remain inoperative in this condition.

When the "Ready" command is received, the motion commander object 135 generates joint angle command values so that the robot straightens its forelegs forward at their elbows, while the head 2A is set upright forward. The wheels remain inoperative also in this case. When the "Go" command is received, command values are issued so that the robot keeps its forelegs straight forward as in the "Ready" state, while the wheels are rotated to move the robot forward.

The motion replay 2 object 132' performs, in accordance with instructions given by motion commander object 135, control of actions other than operations of the wheels, e.g., actions of the forelegs or arms, in relation to the robot actions peculiar to the wheeled configuration. Wheel pattern generator object 137 generates information concerning the control of the wheels, under the control of the motion commander object 135.

The configuration-independent software has no dependency on the robot configuration, and includes objects such as a configuration setting object 140. Configuration setting object 140 receives, from the configuration-dependent software 105, information that is independent of the robot 1 configuration, and forms a robot posture command such as the "Sleep" command that is also independent of the robot configuration, based on the received information. The configuration setting object then delivers the robot posture command to the configuration-independent software.

Configuration setting object 140 issues a command based on the information given by the vision object and indicative of presence or absence, as well as position, of a physical object of a predetermined color, e.g., red. For instance, as shown in FIG. 6, when no red object has been detected over a period of one minute or longer, a command is issued such as to maintain the "Sleep" state if the robot has been in the "Sleep" state; to change the state from "Rest" to "Sleep" when the robot has been in the "Rest" state; to change the state from "Wakeup" to "Rest" when the robot has been in the "Wakeup" state; and to change the state from "Move" to "Wakeup" when the robot has been in the "Move" state. If a red object is detected to have a size smaller than a predetermined value, e.g., 10 or less in terms of a robot set value, and if the detected state has continued for a period not shorter than 10 seconds, a command is issued such as to change the state from "Sleep" to "Rest" if the robot has been in the "Sleep" state, to change the state from "Rest" to "Wakeup" when the robot has been in the "Rest" state, to change the state from "Wakeup" to "Move" when the robot has been in the "Wakeup" state, and to maintain the "Move" state when the robot has been in the "Move" state.

If a red object is detected to have a size greater than the predetermined value, a command is issued such as to change the state from "Sleep" to "Wakeup" if the robot has been in the "Sleep" state, to change the state from "Rest" or "Wakeup" to "Move" when the robot has been in the "Rest" or "Wakeup" state, and to maintain the "Move" state when the robot has been in the "Move" state.

Thus, the highest commanding software in robot 1 has no dependency on the configuration of the robot. Data sent to and received from this software has a format which is independent of the robot configuration. Hence, when the robot configuration changes, only the configuration-dependent software, having dependency on the robot configuration, is revised in accordance with the changed robot configuration. As such, software suitable to the robot configuration is readily obtained.

III. Revision of Configuration-Dependent Software

In the robot 1 of the illustrated embodiment, the configuration-dependent software is revised as a result of processing performed by the object manager in accordance with instructions given by the design robot. In this embodiment, the revision of the configuration-dependent software is achieved through loading and unloading of objects constituting the configuration-dependent software, and by breaking and re-establishing inter-object communication.

Virtual robot 126 acquires, through the robot serial bus DD of the lower layer, information concerning various devices connected to the serial bus, and forms the connection information (CPC Connection information or CPC tree) specifying the configuration of the robot based on the acquired information. The connection information is delivered by the virtual robot to the design robot. The design robot in turn supplies the object manager with an instruction to revise the configuration-dependent software in accordance with the received connection information. The design robot also provides other necessary information to the object manager.

In the illustrative robot, therefore, predetermined information is stored in the memory of each robot component (e.g., legs or wheels). In this manner, virtual robot 126 can acquire information concerning the devices connected to the serial bus, together with position information, by means of data communication performed via the robot serial bus DD 111.

The television camera, speaker, microphone, and various actuators and sensors, which are connected to the serial bus, are the basic elements (CPC primitives) of robot 1. The parts (CPC Models) of the robot are constituted by various different combinations of these CPC primitives (basic elements) that are arranged in a link-like form. For instance, one leg as a part of the robot is defined by a specific link of a plurality of primitives (elements) including three motors and one switch.

Specific identification is assigned to each of these robot parts so that the constituent elements connected to the serial bus can be identified based on the identification data. The identification data is constituted by an ID given at the factory where the parts are manufactured and an ID corresponding to the product number. Information concerning the constituent elements and position information of each constituent element in the part are set by the link information and attribute information of each element, so as to correspond to the above-mentioned identification data, and are stored in the memory of each part together with the identification data of the part. In this embodiment, when the size of the memory available on each part is limited, the memory stores only the identification data, while the information concerning the constituent elements and the position information of the constituent elements in the part are held in a storage area preserved on the main part 2.

When the system,is started up or when a device is changed, the virtual robot operates in accordance with the identification data and position information and so on received from the robot serial bus DD, so as to trace the tree-structured serial bus. Thereby, the virtual robot forms the connection information based on the basic constituent elements (CPC primitives) and the data structure which indicates the sequence of connection of these elements. The virtual robot delivers the thus-formed connection information to the design robot. To this end, the connection information delivered by the virtual robot is constituted by constituent element information (referred to herein interchangeably as CPC Primitive Location Information) corresponding to the robot configuration.

Figure 7:
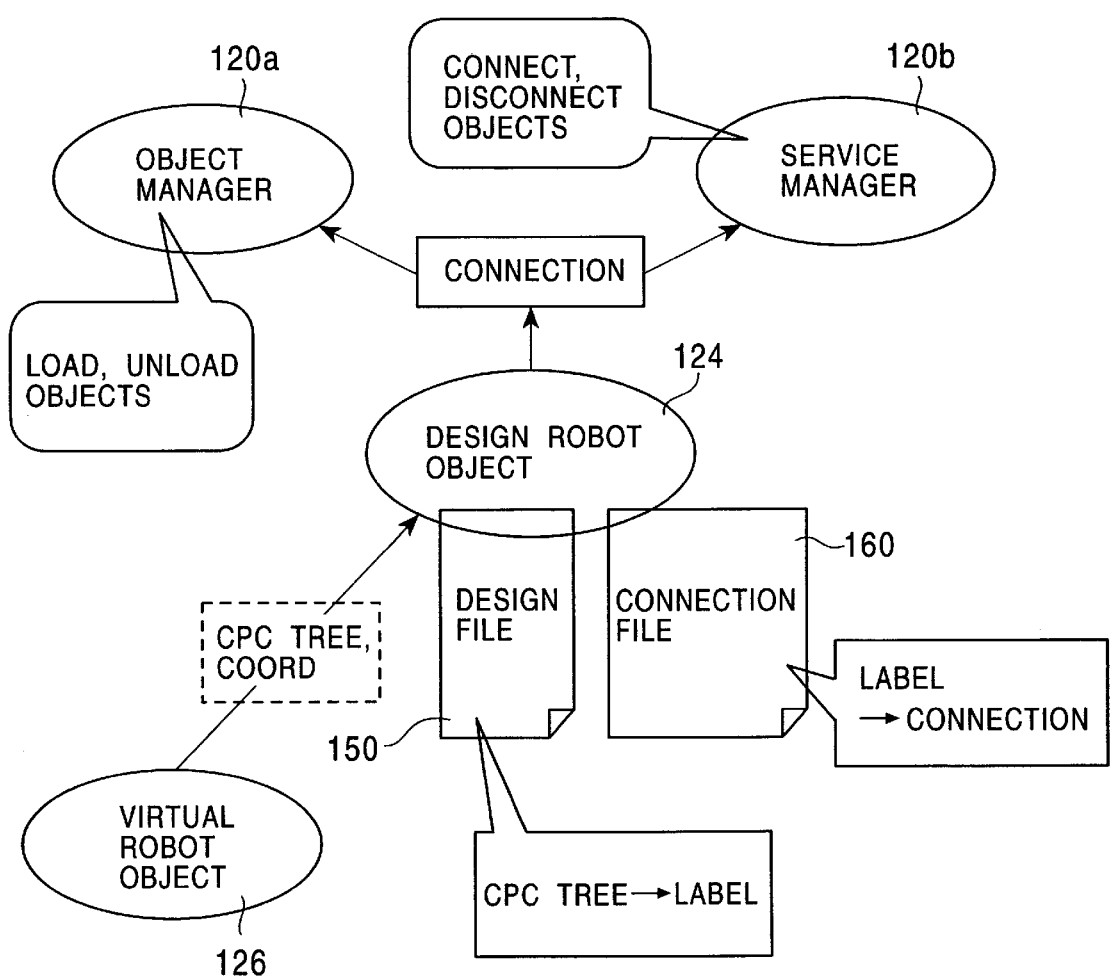
FIG. 7 is a diagram illustrating interaction among robot system software objects.

Referring to FIG. 7, based on the connection information delivered by virtual robot 126, design robot 124 refers to a design file 150 so as to select a connection template which corresponds to the current configuration of the robot 1. This template corresponds to a "label" which will be described later. The design robot object delivers an instruction to the object manager 120 so as to update the configuration-dependent software to a version suitable for the current robot configuration. In FIG. 7, the aforedescribed object manager 120 is comprised of an object manager 120a which handles loading and unloading of objects, and a service manager 120b that handles connections and breaks in connections (disconnections) between objects.

Design file 150, which is preferably written in the form of text data, is formed by adding a label to the group of constituent element information of each part, for each of the possible configurations of robot 1. The constituent element information is constituted by the basic constituent elements (CPC Primitives) and the position information (CPC Coordinate Locator) of the basic constituent elements of each part. The position information comprises coordinate information based on a reference position assumed on the robot 1, and is expressed in terms of an ordinary link coordinate system. Thus, the position information is constituted by a cascade connection of a rotational matrix for coordinate transformation and position vectors.

The label identifies the corresponding object, as well as data necessary for loading of the object and inter-object communication involving the object. The label is constituted by either a design label, a virtual label (which is generally easier to read than the design label), or a composite label constituted by the design label and the virtual label. A virtual label may be replaced by a design label by means of the design robot, so as to be presented for use.

The following expression (1) describes a design label. The design label is constituted by at least one group of constituent element information or by at least one other design label:

```
        Design Label (CPC Primitive Location        (1)
        Information or Design Label);
        . . .
    )
```

The following expression (2) describes a virtual label. The virtual label is constituted by a design label, Constituent elements (CPC Primitives), and position information (CPC Coordinate Locator) of the constituent elements (CPC Primitives).

```
        Virtual Label (                              (2)
            Design Label:
            CPC Primitive:
            CPC Coordinate Locator:
    )
```

The following expression (3) describes a composite label:

```
        Composite Label (                            (3)
            Composite Label;
            or/and Design Label;
            or/and Virtual Label:
    )
```

To this end, the design robot traces the tree structure based on the constituent element information identified by the connection information delivered thereto. If the position information (CPC Coordinate Locator) defined in the virtual label exists at a portion of the tree structure near the end thereof, the design robot substitutes this virtual label for a design label and sets the thus-defined design label as being valid.

Accordingly, in this embodiment, access is made to the design file based on the connection information, whereby the current robot configuration (e.g., four-legged or wheeled configuration) can be differentiated and, at the same time, various data necessary for updating the configuration-dependent software can be acquired.

FIG. 8 is a flowchart illustrating the above-described process conducted by the design robot. Upon receipt of the connection information from the virtual robot, the design robot accesses the design file in step SP2 based on the connection information, whereby the current configuration of the robot 1 is identified. Next, in step SP3, the design robot compares the constituent element information (CPC Primitive Location Information) contained in the connection information received from the virtual robot with the CPC Primitive Location Information contained in connection information held by the design file. In step SP4, based on the result of the comparison made in step SP3, the design robot accesses the design file so as to detect the design label that defines the objects corresponding to the current configuration and the data necessary for rebuilding the inter-object communication.

Next, in step SP5 the design robot accesses a Connection File 160 (see FIG. 7) based on the detected design label, and detects Connection Data corresponding to the label, whereby data are acquired that are necessary for identification of the objects and re-building of the inter-object communication. The Connection File is a file that stores Connection Data in relation to the label. The Connection Data are data that are necessary for identification of the objects and re-building of the inter-object communication. In step SP6 the design robot delivers the Connection Data to the object manager, thereby delivering an instruction for updating the configuration-dependent software. This completes the routine.

FIG. 9A is a list which describes part of the design file. In this design file, DRX indicates the configuration of the robot 1, wherein "4Legged" is a description indicative of the four-legged configuration, while "Head", "RightFrontleg", "LeftFrontLeg", "RightRearLeg" and "LeftRearLeg" respectively indicate the head, right foreleg, left foreleg, right rear leg and the left rear leg of the robot. Thus, the first code sentence signifies that the four-legged configuration is composed of a head, right foreleg, right rear leg and a left rear leg.

In the second code sentence, "Wheel" indicates the wheeled robot configuration. As compared to the first sentence, it is understood from the second sentence that the wheeled robot configuration is constituted by a head, right foreleg, left foreleg, right rear wheel and a left rear wheel. The third code sentence describes that a camera link is provided on the head, whereas the fourth code sentence describes the virtual label of the camera link. In the fifth code sentence onwards, items of position information (CPC Coordinate Locator) are described in the form of a tree, for the components such as the right foreleg, left foreleg, and so on.

Referring to FIG. 9B, a list describing part of the connection information (CPC Connection Information) is shown. In this embodiment, the connection information is described in the form of text data, as in the case of the design file. In the description shown in FIG. 9B, "joint" indicates an interface. Thus, the portion indicated as "joint" constitutes an interface where different constituent elements are connected. Lines 2 to 5 of the description show that a television camera is connected via five hubs, each hub designated as "CO". It is thus understood that the connection information shown in FIG. 9B coincides with the description of the four-legged configuration explained above in connection with FIG. 9A.

Expression (4) below exemplifies part of the Connection File 160. The Connection File is written in the form of text data. The first and second code sentences of expression (4) respectively describe the objects corresponding to the four-legged and wheeled robot configurations, as well as data necessary for building inter-object communications.

More specifically, the first sentence describes an object name "MoNet" as a service name and data format MoNetOutData. Further, subsequent to "O" that indicates an observer, an object name "MoNetReplay" as a service name and data format MoNetOutData are described. Descriptions of subject, observer, data format and so on are made in subsequent lines.

```
DRX 4Legged (                                                    (4)
    S.MoNet.MoNetOutData . . . ,O.MoNetRePlay.MoNetOutData . . .
    S.MoNet.MoNetOutData . . . ,O.WalkingPatternGenerator,MoNetOutData . . .
)
DRX Wheel (
S.MotionGenerator.MCData . . . , O.MotionReplay?.MCData . . .
S.MotionConverter.MCData . . . O.Wheel
)
```

Thus, when the design file as shown in FIG. 9A is used, the design robot operates based on the description of the first sentence reading DRX 4Legged and extracts Connection Data that are described within parentheses ( ) that appear subsequent to DRX 4Legged, and delivers the extracted connection data to the object manager, whereby the configuration-dependent software is revised.

Figure 10:
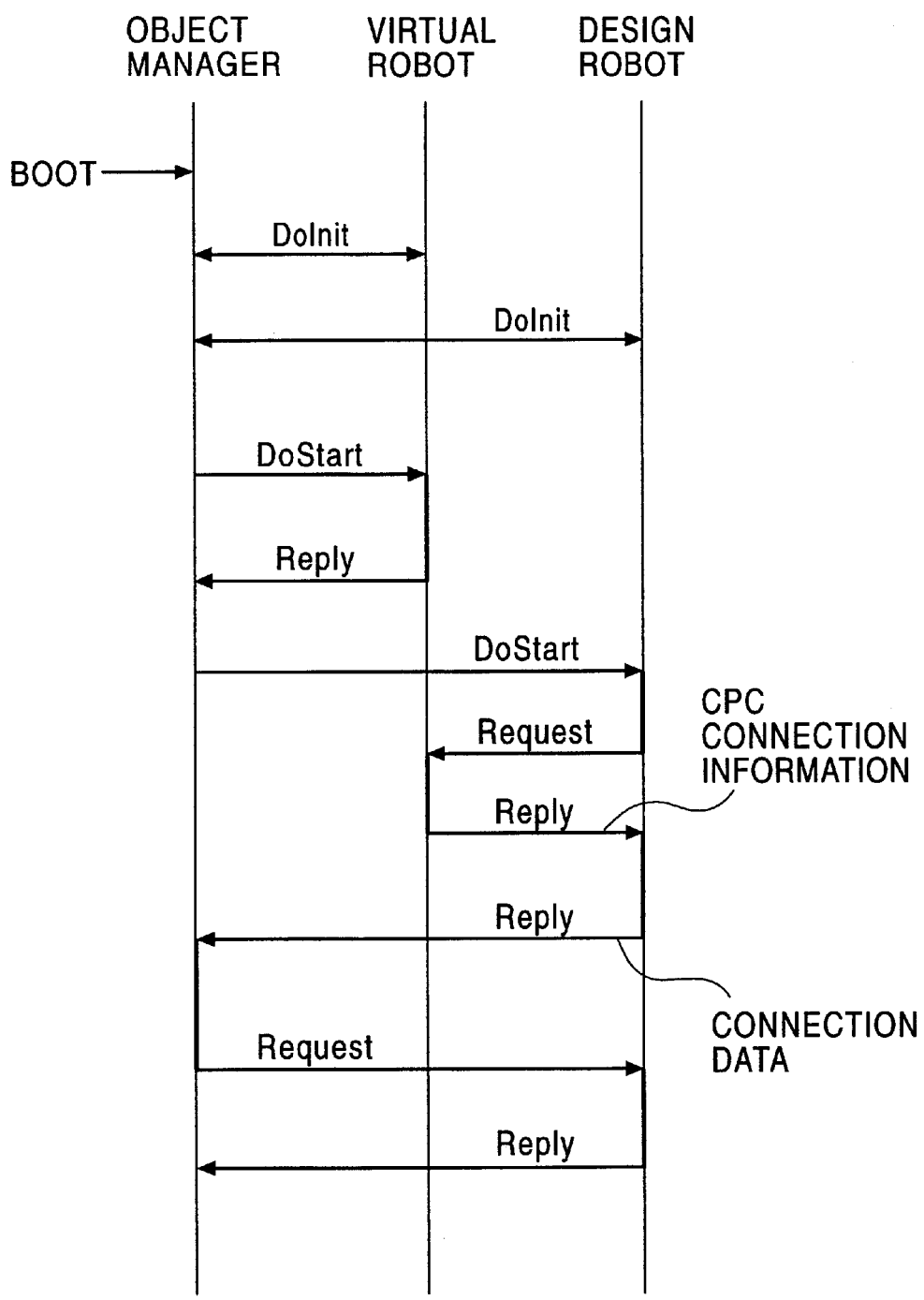
FIG. 10 is a timing diagram depicting actions of an object manager, virtual robot object and a design robot object, after a boot operation.

FIG. 10 is a diagram illustrating processing operations performed by the object manager, virtual robot and the design robot at the time of boot. The robot 1 commences boot processing in response to the power supply being turned on, or to a resetting instruction. In the boot processing, objects are loaded from a file so as to build up configuration-dependent software. Concomitantly, internal variables of the object manager are initialized.

Subsequently, the object manager delivers "Do Initialize" ("DoInit") to each object. In response to DoInit, an inquiry entry (Entry) of each object is registered in the object manager, whereby inter-object communications are built up in the robot system software layer. Next, the object manager delivers "DoStart" to the virtual robot and then to the design robot, whereby the virtual robot and the design robot begin to operate. Consequently, connection information is generated by the virtual robot and, upon request by the design robot, the connection information thus generated is delivered to the design robot, whereby Connection Data is generated. The Connection Data thus formed is delivered to the object manager, whereby configuration-dependent software is built up in accordance with the Connection Data.

A shut-down process is executed as follows: the object manager delivers a "DoStop" command to each object. In response to this instruction, each object ceases to operate by sending an error message responsive to all the requests. Then, the object manager sends to each object "DoDestroy", so that each object releases the resource that has been used by the object, and is set to a stand-by condition after deleting its entry that has been registered in the object manager.

Thus, robot 1, even when started up after a reconfiguration to a different robot configuration, can operate safely under the control of software suitable for the new robot configuration.

Figure 11:
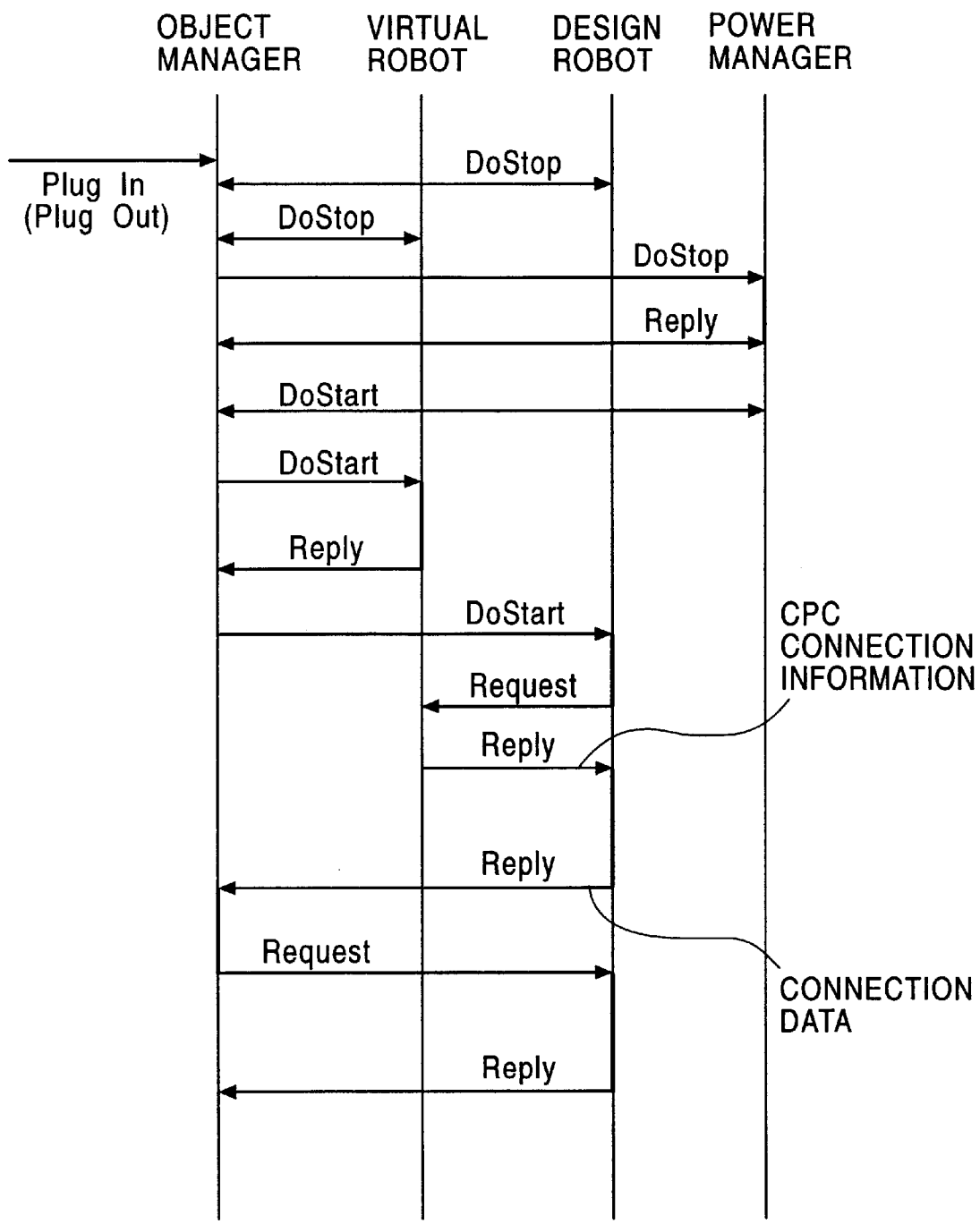
FIG. 11 is a timing diagram depicting actions of the object manager, virtual robot and the design robot, performed in response to plug-in and plug-out operations.

In the case of a so-called Plug-In or Plug-Out condition, a robot part is newly detected to be plugged into, or unplugged from, the robot main body. When this occurs, the object manager delivers a "DoStop" command to each object, as shown in FIG. 11, whereupon each object terminates its operation after relaying "error" to all the requests. Subsequently, as in the case of the boot, the object manager delivers DoStart to the virtual robot and then to the design robot. As a consequence, the virtual robot generates connection information which is delivered to the design robot. The design robot then generates Connection Data based on the connection information, whereby a configuration-dependent software is built-up. Thus, even when the configuration of the robot 1 is dynamically changed by Plug-In or Plug-Out, the robot 1 is controlled by software suitable for the robot configuration after the change.

In the event of depletion of the battery 17, the DoStop and DoStart processing operations are repeated as in the case of Plug-In and Plug-Out, in response to a state change request given by the battery manager. As a result, the state of robot 1 is changed to a mode in which the clock frequency is lowered and operations of unnecessary devices are suspended, while the power supply is switched over to the button cell 29. Conversely, when the battery 17 that has been charged up is mounted, the state is changed into a mode in which the clock frequency is increased and the operations of the devices are commenced by the power supplied from the battery 17.

IV. Processing by Object Manager

In accordance with the information provided by the design robot as described above, the object manager 120 reassembles the objects that constitute the configuration-dependent software, whereby the configuration-dependent software is revised and updated. More specifically, the object manager loads and unloads objects in accordance with the information received from the design robot, and rebuilds the inter-object communications so as to correspond to the unloading and loading of the objects, thereby revising and updating the configuration-dependent software.

If the build up of inter-object communications requires that the object names have been registered in the object manager, independency of each object is undesirably impaired so that a plurality of types of objects have to be prepared. To eliminate this problem, in the illustrative embodiment of the present invention, the object manager builds up the inter-object communications based on the Connection Data output from the design robot, thereby maintaining independency of the objects.

A description of inter-object communication will now be presented, which is applicable to any of the objects within robots or other devices of the present invention. To simplify the description, specific object names will not be presented. Also, it is assumed that the inter-object communication is executed in an asynchronous manner.

Figure 12:
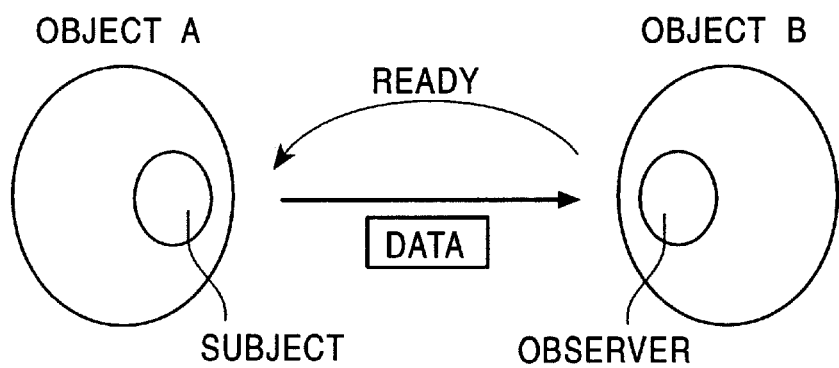
FIG. 12 schematically illustrates the relationship between an observer and a subject.

Referring to FIG. 12, there is shown a diagram schematically illustrating the basic structure of inter-object communication between two objects that can be used in embodiments of the invention. In the example presented, the inter-object communication is executed by using "Ready" and "Notify" commands, so as to prevent delivery of data in excess of the processing capacity of the object that received data (Object B in this case). In FIG. 12, object A sends data from a class 0 subject as a member of object A to a class 0 observer which is a member of object B, whereby the "method" of object B is invoked. The delivery of the data from the subject to the observer is conducted only when the "Ready" signal is received from the observer. The Ready signal is delivered once for each data transmission. Thus, object B as the observer becomes ready to receive subsequent data only after processing of the received data is completed.

Figure 13:
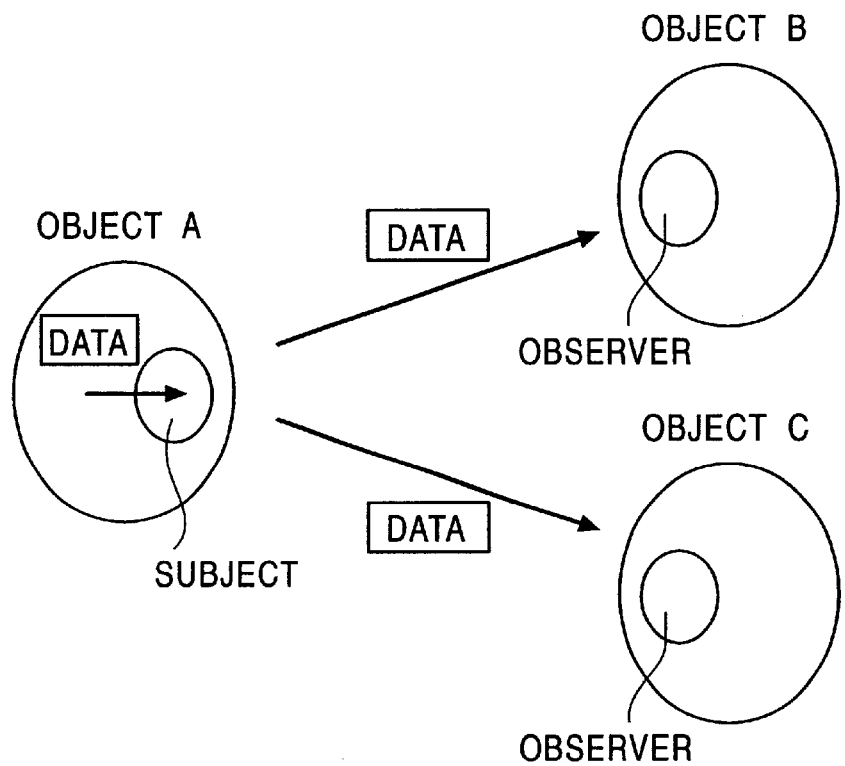
FIG. 13 schematically illustrates the relationship between observers and a subject in a multi-observer system.

FIG. 13 is a diagram schematically showing the basic arrangement for inter-object communication in a multi-observer system. In this case, object A serving as the subject can deliver data either to all the observers or only to a selected observer identified by the object ID. The delivery of data in this multi-observer system is conducted only to the observer that issues the Ready signal, as in the previous case of FIG. 12. When an object ID identifying an object and a selector number (selector) identifying a method are given, the identified object(s) starts entry of the designated method and delivers the desired data to a specified observer.

Figure 14:
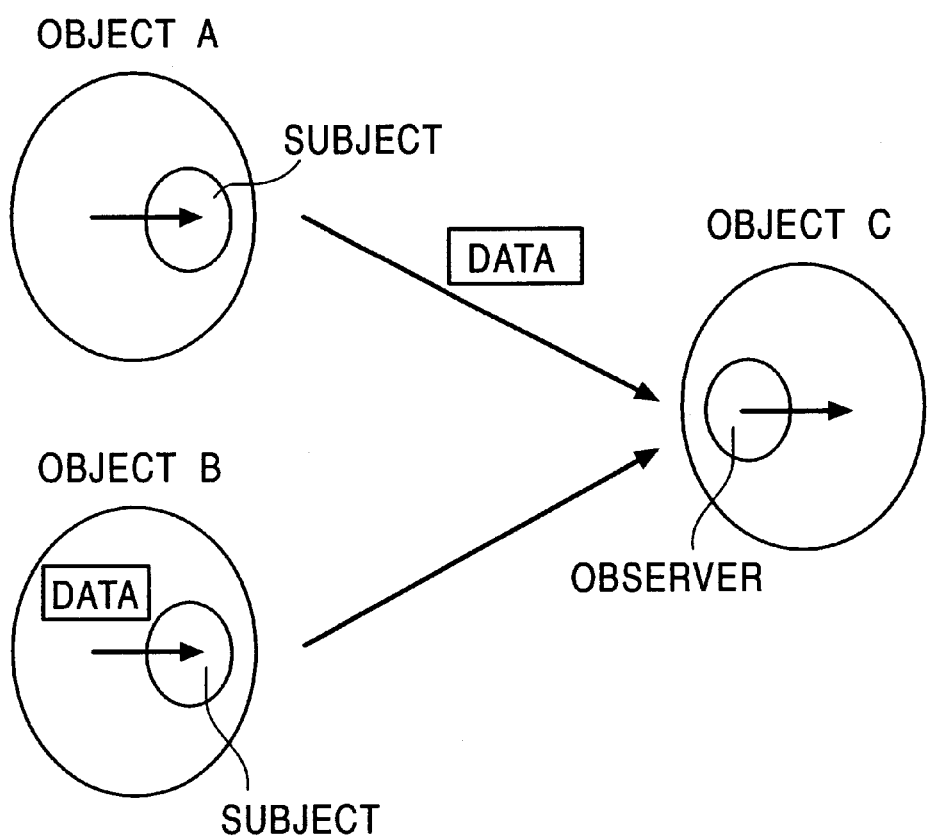
FIG. 14 is a diagram schematically showing the relationship between an observer and subjects in a multi-subject system.

FIG. 14 is a diagram schematically showing the basic structure of inter-object communication in a so-called multi-subject system. In this case, both objects A and B serve as subjects, while the object C alone serves as the observer. Thus, the observer can receive data from each of a plurality of subjects and, each time the data is received, a method for processing the data is also invoked. The observer can select the subject by issuing the Ready signal only to a specific subject that is identified by the subject ID, so that it can receive only the required data.

Thus, in the illustrated embodiment, at least for the objects which belong to the configuration-dependent software layer, the inter-object communication is executed by using the Ready signal and the notification signal (Notify), as described with reference to FIGS. 12 to 14, and a multi-observer or multi-subject system can be implemented as desired to connect other objects. Namely, an object that has a plurality of observers is equipped with connect entries of the same number of observers.

Figure 15:
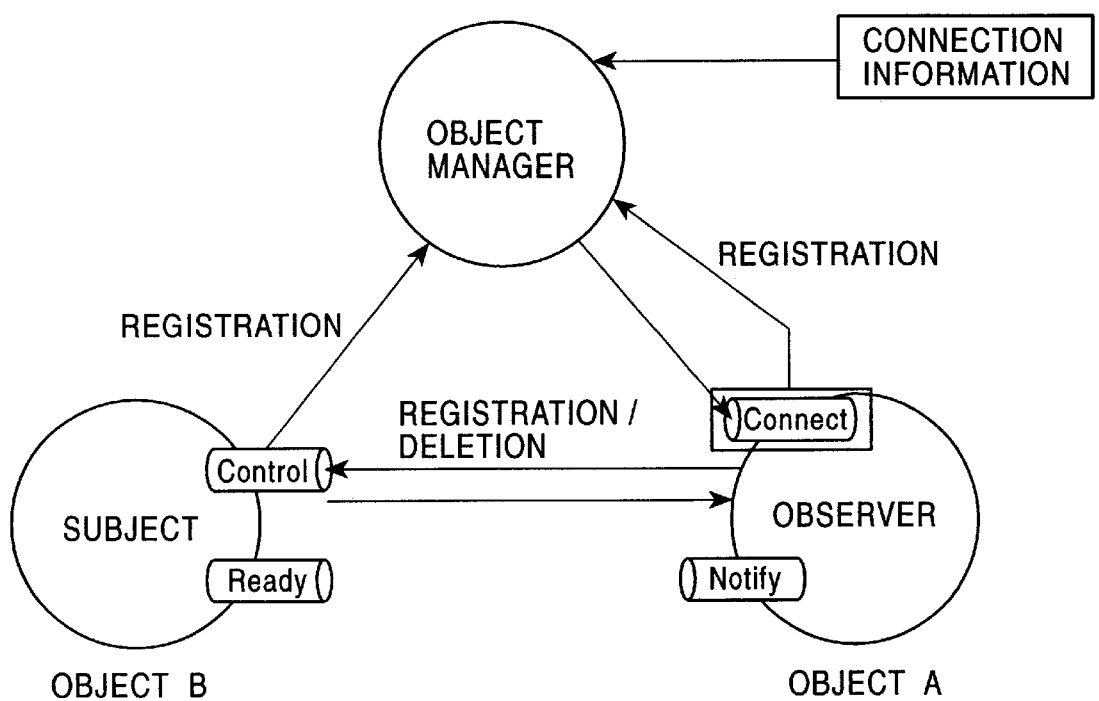
FIG. 15 is a diagram schematically showing the relation of an observer and a subject to an object manager.

FIG. 15 illustrates the relationship between an object manager and each of a plurality of objects. The objects exchange data with each other by means of the object ID and the method specified by the selector number (Selector). In each object, selector numbers "0" to "3" are assigned to basic methods, regardless of the subject or observer corresponding to the object.

In this example, the selector number "0" is assigned to "Do Initialize" (DoInit). Each object is initialized when the DoInit method is started. The selector number "1" is assigned to "DoStart". Each object starts to operate when DoStart is started. Conversely, when the "DoStop" method (selector number "2") is started for a particular object, that object ceases to operate. When "Do Destroy" (selector number "3") is invoked for a specific object, that object releases the resource.

Further, each object is arranged to communicate, by means of return values, names of services made by the observer, selector numbers and so forth, in compliance with requests given by the object manager and other objects.

Accordingly, in the illustrative embodiment of the invention, loading and unloading of objects and subsequent rebuilding of inter-object communication can be conducted by the object manager, based on the Connection Data given by the design robot.

Expression (5) below contains exemplary Connection Data given by the design robot, described in the form of text data by using a colon as a demarcation between the name of a service of the subject and the name of a service of the observer. Regarding the subject, the description begins with "S" that indicates the subject, followed by "FooB" which is the object name, "Image" which indicates the data form, and "RightCamera" which is the name of the constituent element. As to the object, the description begins with "O" that indicates the object, followed by "FooA" which is the object name, "Image" which indicates the data form, and "Right-Camera" which is the name of the constituent element.

$$S.FooB.Image.RightCamera:O.FooA.Image.RightCamera \quad (5)$$

The object manager, when loading an object, detects the name of the object to be loaded based on the description of the Connection Data. Further, the object manager loads the object of the detected object name from a predetermined file, while preserving a stack memory (stack) and a heap memory (heap). The object manager also serves to acquire the object ID from an operation system (OS) and records this object ID together with the object name described in the Connection Data.

The object manager is arranged to execute the above-discussed processing operations such as DoInit, DoConnect and DoStart (which are explained further below) by using the object ID registered in the described manner.

The DoInit processing is as follows: based on the acquired object IDs and the above-mentioned selector numbers, the object manager calls DoInit for all the objects acquired through the loading. In response to the call of DoInit, each object initializes its internal variables. Consequently, each object is initialized in the object manager. In this initialization processing, the object manager operates so as to register the entry (Control) of each object as a subject and the entry (Connect) of the object as an object, based on the information provided by each object. This registration is constructed corresponding to the description of the subject and the object in the Connection Data, i.e., by the names of the object and subject.

The operation executed in accordance with the DoConnect command is as follows: based on the registration made in the DoInit operation, the object manager operates to communicate the entries (Connect) of the objects having observers of the subject (Object ID) ID and the entry (Control) of the subject to be registered. Each object receiving this information invokes the subject corresponding to the informed subject ID and the entry (Control), and the entry (Notify) is connected to and registered in the invoked subject. The subject requested to be registered sends the Ready command to the observer, whereby the observer is connected to the corresponding subject.

Inter-object communication is thus established between the observer and the subject. In this operation, the object manager informs the observer notified by the Connection Data of the subject ID (object ID) and the entry (Control) of the corresponding subject. In this embodiment, therefore, each object can be developed without requiring any explicit indication of objects to which the developed object is to be connected, and is connectable as required to various types of objects in accordance with the instruction given by the object manager. It is thus possible to ensure higher degree of independency of each object relative to the known art.

Concomitantly, the inter-object communication can be built up by the object manager in accordance with the Connection Data, so that the configuration-dependent software can be easily and freely revised and updated in conformity with the current robot configuration.

The operation in accordance with the DoStart instruction is as follows: the object manager sends the selector number "1" to each object (where "1" represents the DoStart instruction in this example). Each object, when it has an observer, responds by sending "Ready" to the subject, by using the subject ID and the entry (Ready) that have been acquired by the DoConnect operation. The object thereby becomes ready to receive data from the corresponding subject, and the configuration-dependent software starts to run.

In the case of a multi-observer arrangement, the subject sends data, e.g., a sensor output, to the observer that is issuing "Ready" among the registered observers. This observer sends "Ready" when it becomes ready to receive subsequent data after completion of processing of the received data.

In contrast, in case of "Shut Down", "Plug-In", "Plug-Out" and "State Change", the connection data sent from the design robot differs from the registered content that has been previously sent by the design robot. In this case, the object manager sends the DoStop instruction to each object, by sending the selector number "2". In the meantime, the observer cancels the entry (Ready).

In the "DoDisconnect" processing, the object manager serves to cut the communication connection between the subject and the observer. More specifically, the object manager sends the "DoDisconnect" message to the entry (Connect) of the observer, so that the observer causes the corresponding subject to issue a disconnection request (Remove Observer), thereby cutting the communication connection.

The "DoDestroy" processing is as follows: the object manager sends the DoDestroy message to the corresponding object, by sending the above-described selector number "3", thereby destroying this object. The destruction is conducted by executing dismissal of the registration that was made in the "Do Initialize" (DoInit) processing.

In the "Object Unload" processing, the object manager opens the stack memory and the heap memory for the object that was destroyed by the DoDestroy processing, thereby unloading the object. At the same time, the subject ID and the subject name that were registered at the time of loading are deleted.

Figure 16:
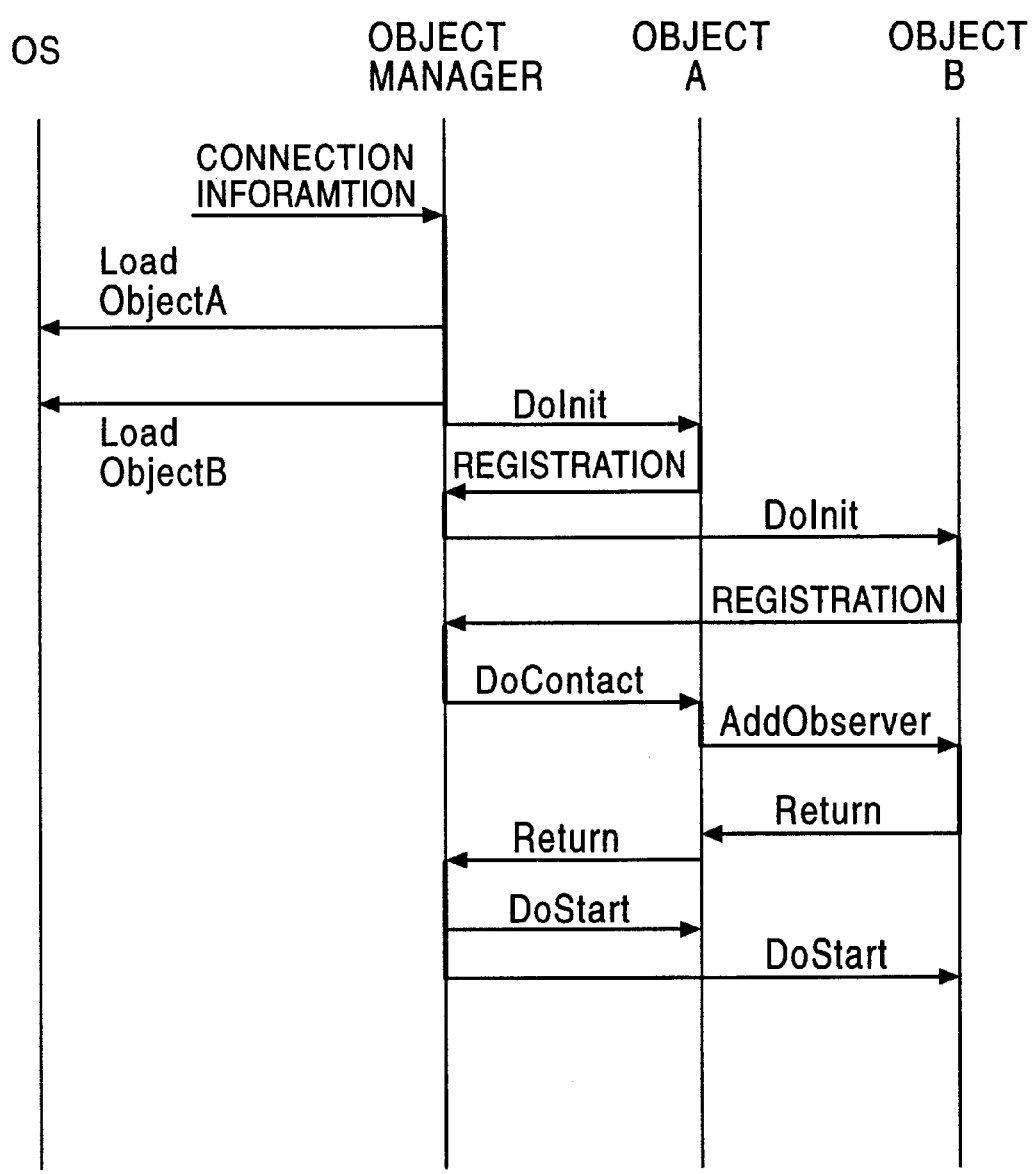
FIG. 16 is a flow diagram illustrative of the operation performed by the object manager upon receipt of connection information.

Upon receipt of, for example, the Connection Data from the design robot through the described control, a control sequence is executed down to DoStart as shown in FIG. 16. More specifically, the object manager is started in response to a message that carries the Connection Data, and operates to load, for example, an object A and an object B that are described in the Connection Data. In this case, the loading of object A and object B are executed in accordance with a system command of the operation system. The object manager acquires the object IDs of objects A and B and registers the acquired object IDs.

Subsequently, the object manager starts "Do Initialize" (DoInit) of both object A and object B, based on the acquired object ID and the selector number "0", whereby the entry (Control) as a subject and the entry (Connect) as an object are acquired from objects A and B and registered.

Then, "DoConnect" of object A (serving as the observer) is initiated based on the registered entry (Connect), whereby object A is connected to object B (the latter serving as the subject). It is thus possible to build up inter-object communication based on the Connection Data. The object manager then commences DoStart of objects A and B.

Figure 17:
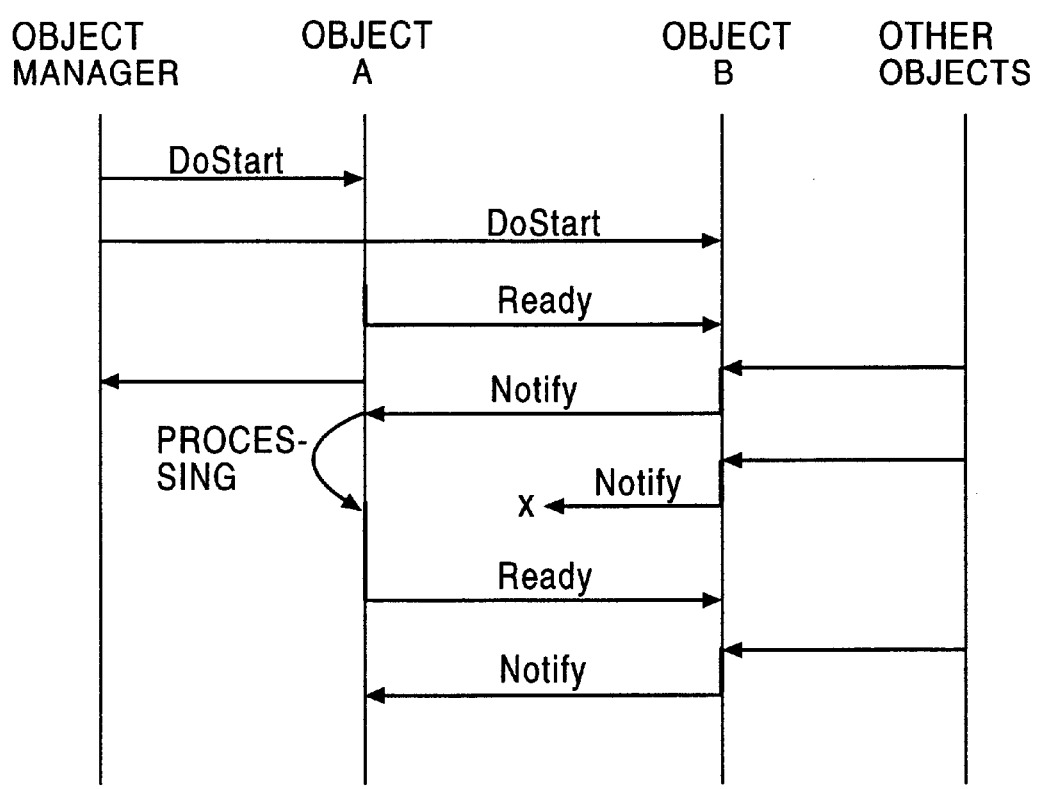
FIG. 17 is a flow diagram depicting a sequence which begins with DOSTART.

FIG. 17 is a timing diagram showing the sequence which begins with the DoStart command. Object A, object B and other objects are started in response to the DoStart message sent by the object manager. These objects then execute inter-object communications by using the Ready and Notify messages (described previously). More specifically, object A sends the Ready message to the Ready entry of object B, and object B sends a message to the Notify entry of object A, whereby data is sent from object B to object A. If the message has not yet been sent from object A to the Ready entry of object B as the data is being processed by object A, the Notify entry of object A by object B is registered, and the sending of the data from object B is executed only after the Ready entry of object B by object A. In this inter-object communication, therefore, sending of data in excess of the data processing capacity of object A is prevented.

Figure 18:
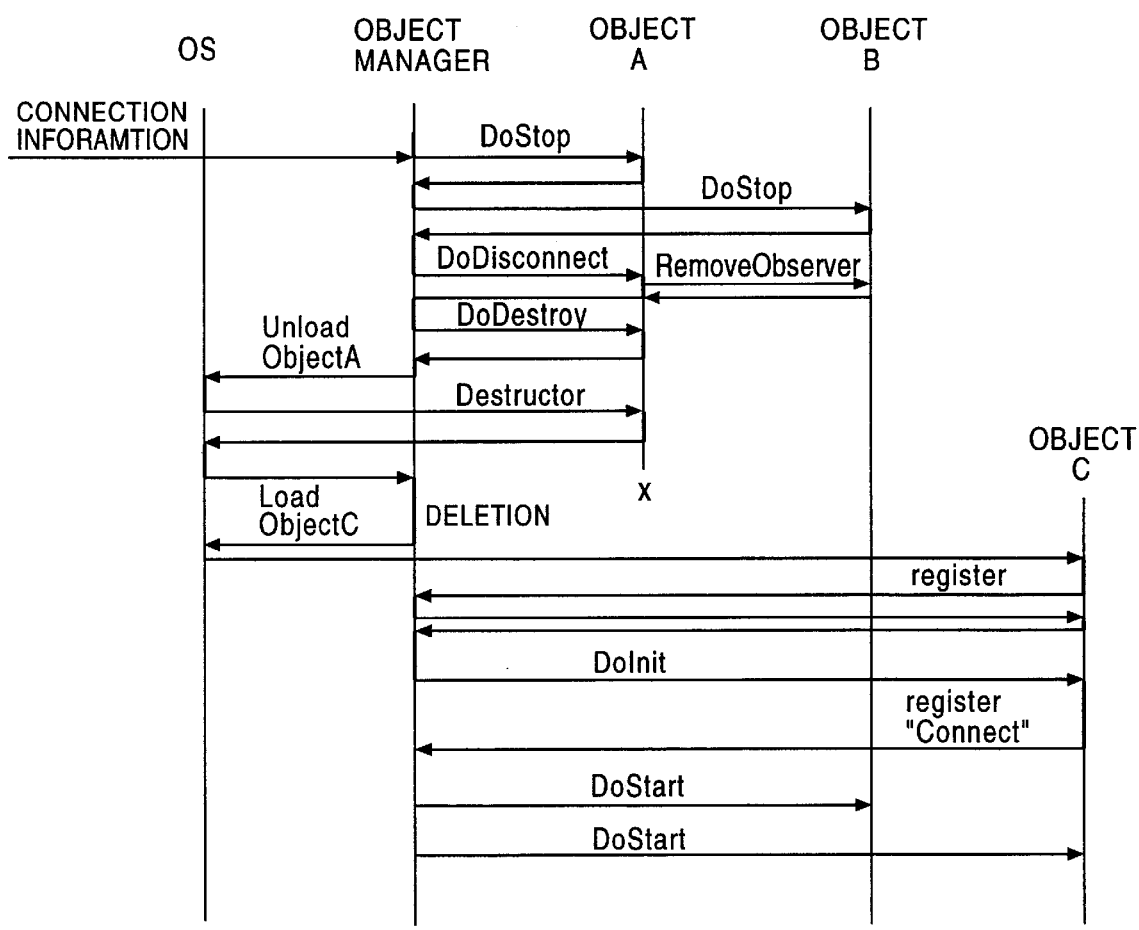
FIG. 18 is a flow diagram showing sequences executed at plug-in, plug-off and state change.

FIG. 18 is a timing diagram showing the sequence which is followed at the time of "Plug-In", "Plug-Out" and "State Change". If the Connection Data received from the design robot differs from the registered contents previously received from the design robot, the object manager sends the DoStop instruction to all the objects, thereby ceasing the operations of all the objects. More specifically, object A and object B dismiss the entries (Ready) so as to prohibit commencement of their "Notify" entries.

Upon completion of the "DoStop" of all the objects, the object manager sends "DoDisconnect" to object A so as to disconnect this object from other objects, and starts "DoDestroy" of this object A, whereby the resource of object A is released and the registration of object B that was made by DoInit is dismissed.

When the "DoDestroy" processing is finished for the objects that are to be destroyed, the object manager executes "unload" in accordance with a system command of the operation system. More specifically, a "destructor" of the object of concern is invoked. In this case, the "destructor" of the object A is invoked, so that the registration of the object A that was made at the time of loading is dismissed. Further, the object manager opens the stack memory and the heap memory, thereby completing unloading of object A.

Subsequently, the object manager gives an instruction to load an object C, in accordance with the Connection Data. Thus, DoInit, DoConnect and DoStart commands are sequentially started in the same manner as that described above with reference to FIG. 16. It is thus possible to alter the configuration composed of object A and object B into a configuration composed of object B and object C, without any compiling during the operation.

V. Registration of Object by Associative Memory

Figure 19:
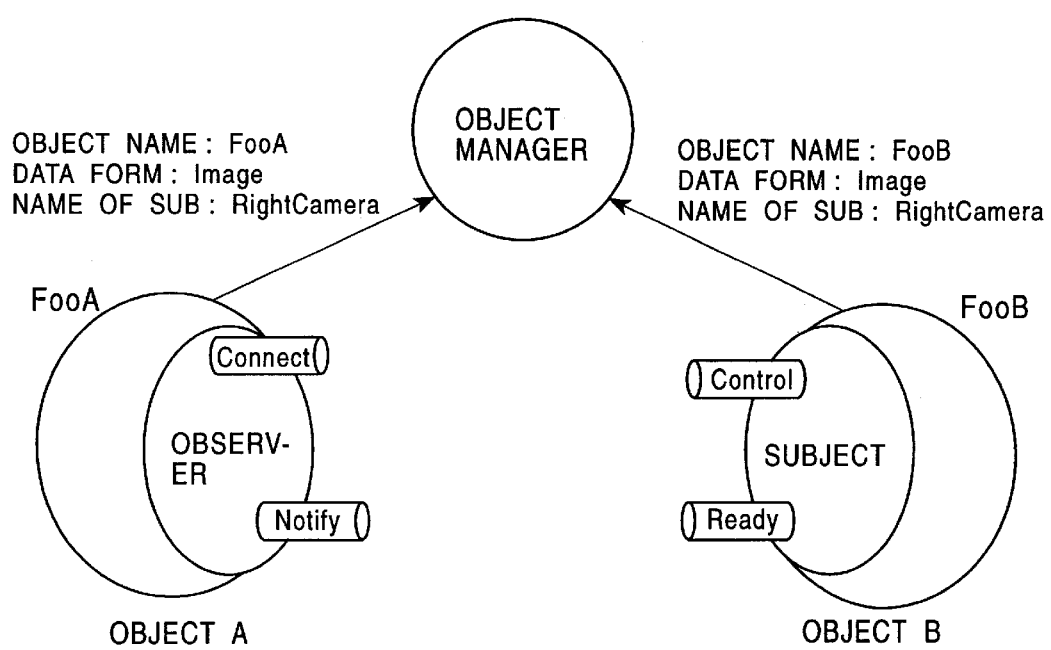
FIG. 19 is a diagram schematically showing the relation of the observer and the subject to the connection information.

FIG. 19 schematically depicts object A and object B under the Connection Data expressed by the foregoing expression (5). The object manager holds and records the Connection Data in an associative memory (or memories) and, when registering the objects by starting "Do Initialize" (DoInit) of the objects, registers the objects in the associative memory based on the description of the Connection Data.

In the example of FIG. 19, the object name of object A serving as the observer is "FooA", the object name of object B serving as the subject is "FooB", the data form is "Image" and the name of the sub is "RightCamera". Thus, the Connection Data between the subject and the object are expressed by: (S.FooB.Image.RightCamera:O.FooA.Image.RightCamera), using a colon as the demarcation between the service name of the subject and the service name of the observer.

Figure 20:
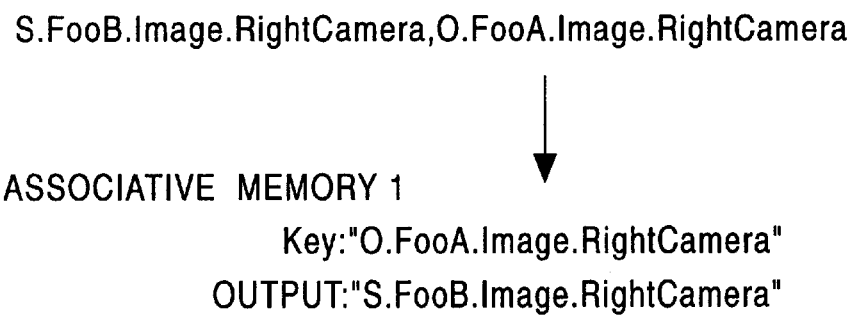
FIG. 20 is a description of a first associative memory.

Upon receipt of this Connection Data from the design robot, the object manager accumulates the description of the subject service name (S.FooB.Image.RightCamera) in the associative memory 1, using as a key the description of the observer service name (O.FooA.Image.RightCamera), as will be seen from FIG. 20.

Each object then operates in response to the DoInit command to communicate the registration entry of the object manager of the service name and the selector number. The object manager stores the service name and the selector number thus communicated in an associative memory 2, thereby registering each object. More specifically, object A as the observer communicates the service name of a description which is the same as the description (O.FooA.Image.RightCamera) of the observer service name in the Connection Data and communicates also the selector number of the connection entry. It is assumed here that the selector number for the object A is "5".

Figure 21:
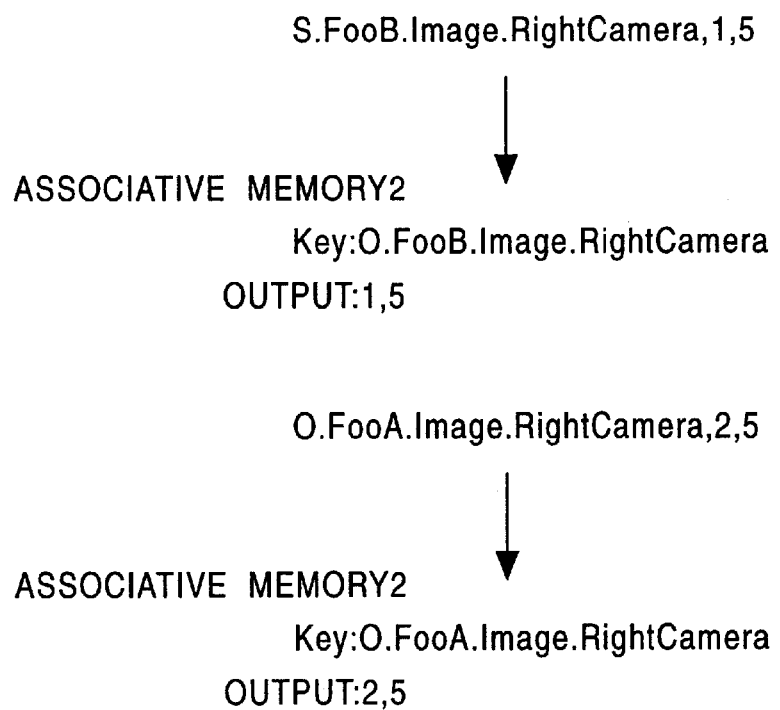
FIG. 21 is a description of a second associative memory.

The object manager operates so as to store in the associative memory 2 the object ID and the selector number (OID, Entry)=(2,5) of the object A, using as a key the description (O.FooA.Image.RightCamera) of the observer service name in the connection data (Connection Data), as will be seen from FIG. 21. The object ID of the object A has been informed as being a value "1", from the operation system.

In the meantime, object B as the subject communicates the service name described in conformity with the description of the subject service name (S.FooB.Image.RightCamera) in the Connection Data, as well as the selector number of the connection entry. It is assumed here that the selector number for object B is "5".

The object manager operates so as to store in the associative memory 2 the object ID and the selector number (OID, Entry)=(1,5) of the object B, using as a key the description (S.FooB.Image.RightCamera) of the subject service name in the Connection Data, as shown in FIG. 21 together with the description concerning object A. The object ID of object B has been designated as being a value "2", from the operation system.

When "DoConnect" is executed, in the object manager, the description concerning the subject and the description concerning the object of the Connection Data are separated. More specifically, in the object manager, the Connection Data is divided so as to correspond to the key (O.FooA.Image.RightCamera) stored in the associative memory 1 and one of various descriptions (O.FooA.Image.RightCamera) stored in the associative memory 1 by means of the key (O.FooA.Image.RightCamera). Further, the object manager makes retrieval through the associative memory 2, based on the separated descriptions, thereby detecting the object ID and the selector number (1,5) of the corresponding observer, as well as the object ID and the selector number (2,5) of the corresponding subject.

The object manager then sends the message of the object ID and the selector number (2,5) to the object ID and the selector number (1,5), thereby starting the connector entry of the observer, and informs this connector entry of the information of the subject composed of the object ID and the selector number (2,5). The control entry of the subject by the object ID and the selector number (2,5) is then started by the above-mentioned connector entry, and the object ID and the selector number (1,6) ("Notify", in this case) of the observer are registered in the started control entry. The observer acquires the selector number of "Ready" by the return value, and registers this selector number.

Thus, in the object manager, connection between the objects is established by using the associative memories 1 and 2.

When the connection between the objects is established as described, the object manager serves to store in an associative memory 3 the description (S.FooB.Image.RightCamera) concerning the subject in the Connection Data, by using as a key the description (O.FooA.Image.RightCamera) concerning the object. Further, the object manager operates to delete from the associative memory the description (S.FooB.Image.RightCamera) concerning the subject that has been stored by using as the key the description (O.FooA.Image.RightCamera) concerning the observer.

Thus, the object manager ensures that the observer and the subject, with inter-object connection established therebetween by the description corresponding to the Connection Data, are registered in and held by the associative memory 3.

To this end, when executing "DoDisconnect", the object manager performs a reverse operation to the described "DoConnect" operation: namely, it breaks the connection, deletes the description in the associative memory 3 and stores this description again in the associative memory 1, while deleting the corresponding description in the associative memory 2.

It is assumed here that Connection Data expressed by the following expression (6) is delivered from the design robot, as a result of the revision of the configuration-dependent software:

S.FooB.Image.RightCamera:O.FooC.Image.RightCamera (6)

This Connection Data describes a change of the observer from the object B to the object C. In this case, the object ID and the selector number (1,5) that has been set in the observer by the key (O.FooA.Image.RightCamera) are detected from the associative memory 2. Then, the "DoDisconnect" instruction is given to object A serving as the observer, by means of the object ID and the selector number (1,5) and, at the same time, corresponding description (descriptions of object A and object B serving as the observer and the subject, respectively) in the associative memory 2 is deleted. Further, the corresponding description is deleted from the associative memory 3 and recorded again in the associative memory 1.

Namely, the object manager operates to delete from the associative memory 2 the descriptions of the object IDs and the selector numbers that have been stored by means of the keys (O.FooA.Image.RightCamera) and (S.FooA.Image.RightCamera). Accordingly, the object manager can dynamically change the objects.

Robot Operation

In accordance with the foregoing description, the robot 1 shown in FIG. 1A can have the four-legged configuration with four legs constituting the moving unit 3 attached to the main part 2. With this configuration, robot 1 can walk using the four legs, by means of motors incorporated in the legs. Robot 1 can also have the wheeled configuration with the rear legs substituted by wheels. The wheels are preferably power driven to effectuate the robot movement.

As described previously in connection with FIG. 2, the operations of the moving unit 3 and other parts are controlled in accordance with control instructions given by the central processing unit 22, based on the outputs from sensors that are arranged on the robot components 24, 25, 26 (e.g., legs, wheels, arms, etc.) as well as information obtained through various information acquisition means provided on the head 2A.

Returning to FIGS. 3 and 4, software of the object-oriented commanding layer operates various device drivers on the commanded device driver layer, thereby executing the above-described control. In this control, the robot system software of the commanding layer commanding the device driver layer detects various parts connected to the serial bus by means of the virtual robot. The virtual robot supplies the design robot with connection information (CPC Connection Information) which indicates what types of components are connected (e.g., legs or wheels) and how these components are connected to complete the robot 1. Consequently, the current configuration of the robot can be identified by the devices connected to the serial bus, whereby the parts or components to be controlled are definitively identified.

In robot 1, the software of the layer which commands the robot system software 101 is revised and updated in accordance with the connection information, whereby the overall control of the robot is performed by the software which best suits the current robot configuration. To this end, in robot 1, the design robot object 124 of the robot system software 101 compares a design file which has been formed by attaching labels to constituent element information (CPC Primitive Location Information) of the respective parts constituting each robot configuration with the connection information provided by the virtual robot, and selects objects that conform to the current robot configuration. The configuration-dependent software is then revised by using the selected objects, as described previously with reference to FIGS. 7 and 8. Thus, the software is updated easily to conform to the current robot configuration, so that the overall action of the robot can be adequately controlled.

The software of the commanding layer is divided into the configuration-independent software which has no dependency on the robot configuration, and the configuration-dependent software which does depend on the robot configuration. Data that are handled by the configuration-independent software independently of the robot configuration are converted by the configuration-dependent software into data corresponding to the current robot configuration, and the thus converted data are exchanged between the configuration-dependent software and the robot system software. Thus, only the configuration-dependent software is revised and updated. Thereby, the revision of the software can be easily implemented.

Further, the virtual robot generates the constituent element information (CPC Primitive Location Information) described in the form of text data, as shown in FIGS. 9A and 9B. The design file also is described in the form of text data. Therefore, the present invention is easily adaptable to a variety of robot configurations that may be developed in the future.

In robot 1, the update of the software is executed by the object manager which reassembles the objects constituting the configuration-dependent software. For instance, at the time of the booting, the design robot informs the object manager of the Connection Data which instructs to connect the objects conforming to the current robot configuration, so that the object manager operates to load the objects designated by the Connection Data.

After initialization of the loaded objects, the object manager connects the subject and the observer in accordance with the Connection Data to enable data exchange therebetween, whereby the configuration-dependent software is built up by the objects that suit to the current robot configuration.

In robot 1, therefore, the software can be built-up by the objects that are designed without envisaging any object to be connected. In addition, the Connection Data is generated in accordance with each robot configuration, enabling easy set-up of software suitable for the current robot configuration. It is also to be appreciated that the revision of the software can be made without requiring any re-compiling and re-linking. Consequently, in the robot 1 of the present invention, the objects can have independency dramatically enhanced over the prior art. This means that a variety of software can be readily and quickly obtained to handle a versatile change in the robot configuration. Via suitable setting of the Connection Data, it is possible to establish inter-object communication between a single object and a plurality of other objects.

The design file stores a plurality of sets or combinations of Connection Data, and the design robot selects one set of Connection Data from the design file and delivers the selected file to the object manager. Various software versions corresponding to various robot configurations can easily be implemented by suitably preparing the designs to be stored in the design file.

It is also possible to easily revise the Connection Data because the Connection Data is preferably written in the form of text data.

A change in the configuration of the robot 1 is detected by the virtual robot. The virtual robot informs the design robot of the connection information (CPC Connection Information) concerning the robot configuration after the change. The design robot then compares the connection information with designs in the design file, and generates Connection Data corresponding to the new robot configuration, based on the result of the comparison. In accordance with the Connection Data thus formed, the object manager unloads the objects that have become unnecessary, while loading objects that have become necessary as a result of the change of the robot configuration, whereby the objects constituting the configuration-dependent software are reassembled. These objects are connected in accordance with the Connection Data so as to be mutually communicable, whereby the configuration-dependent software is updated.

Thus, in the robot 1 of the present invention, the configuration-dependent software can easily be updated adapting to the current robot configuration, while allowing the configuration-independent software to continue to run. The software update can also be performed to change the mode of operation into a power saving mode.

Advantages of the Described Embodiment

As will be understood from the foregoing description, the robot of the present invention can have various configurations through replacement of the robot components. The objects are connected by the object manager in accordance with the connection data, so as to be mutually communicable. Consequently, each object can have a greater degree of independency than those in the prior art, which in turn permits easier revision of the software in accordance with the current robot configuration. It is also to be noted that the revision of the software can be easily achieved without the need for recompiling and re-linking. Further, by suitably setting the Connection Data, it is possible to establish inter-object communication between a single object and a plurality of other objects.

Connection of the objects can be easily achieved because the Connection Data identifies the objects to be involved and the type of data to be exchanged. The connection of objects is achieved in accordance with Connection Data selected from among a plurality of sets, combinations or types of connection data stored in the design file. Therefore, by preparing a suitable design file, it is possible to readily provide different versions of software adapting to a variety of robot configurations.

When the robot configuration is changed, disconnection and connection of objects are conducted such that the objects that have been employed for the old robot configuration are disconnected and the objects to be employed for the new robot configuration are connected to achieve inter-object communication in accordance with the Connection Data. It is therefore possible to update the software adapting to the new robot configuration, without requiring operation of the software to be suspended or terminated.

It is also to be understood that the software can be revised in conformity with the robot configuration, based on the Connection Data that are provided by the virtual robot capable of detecting the robot components employed. Further, since the Connection Data is described in the form of text data, it is possible to easily and promptly generate software adapting to the current robot configuration.

Moreover, the inter-object communication is performed through exchange of messages "Ready" and "Notify", so that exchange of data at a rate exceeding the processing capacity of the objects can be avoided.

Other Embodiments

In the embodiment heretofore described, the selector numbers of "DoInitialize" and so forth have been set beforehand. This, however, is not exclusive and the arrangement may be such that the selector number is set when, for example, "DoInitialize" of the object is started in accordance with the Connection Data. It is also possible to arrange such that the selector number is set when, for example, "DoInitialize" of the object is started in accordance with the content of registration of the object in the object manager.

In the described embodiment, re-assembling of the objects in accordance with the Connection Data is executed only for the configuration-dependent software. This also is illustrative and the present invention may be modified such that the entire software is revised in accordance with the Connection Data, or such that only the device driver layer is revised in accordance with the Connection Data.

In the foregoing description, the robot embodying the present invention operates based on the observer pattern constituted by observer and subject. This also is illustrative and the invention can also be embodied in another type of robot such as a robot relying on a sever-client system. In such a case, a client receives the Connection Data as input data and connects the data to a server, whereby the system can be implemented without requiring the server name to be described in the source code. Thus, the client and the server of the server-client system constitute respective objects.

Although in the described embodiment the inter-object communication is performed based on exchange of the "Ready" and "Notify" messages, the present invention can widely be applied to various types of inter-object communication that employ a variety of data exchange methods.

As will be understood from the foregoing description, according to the present invention, it is possible to enhance the independence of objects over the known arts, by the feature in which the objects are connected in accordance with connection data, so as to be mutually communicable.

While the present invention has been described above in reference to preferred embodiments thereof, it is understood that these embodiments are merely exemplary and that one skilled in the art can implement many changes to the disclosed embodiments without departing from the spirit and scope of the invention as defined by the appended claims.

What is claimed is:

1. A robot apparatus, which is controlled by software composed of objects through inter-object communication, comprising:

a main body;

a plurality of replaceable component parts which are connected to the main body;

means for detecting connection information based on the component parts connected to the main body;

means for storing a plurality of connection templates which are described for each of a plurality of configurations of the robot apparatus;

means for identifying a current configuration based on a comparison between the connection information and the connection templates; and means for updating configuration dependent software by re-building of the inter-object communication in accordance with the current identified configuration of the robot apparatus.

2. The robot apparatus according to claim 1 wherein the connection templates are described by adding a label to constituent element information for each of the configurations of the robot apparatus.

3. The robot apparatus according to claim 2 wherein the label indicates at least a name of the object which is used and a data format type which is used.

4. A method for use in a robot apparatus having a main body and a plurality of replaceable component parts connected to the main body, said robot apparatus being controlled by software composed of objects through inter-object communication, said method comprising the steps of:

detecting connection information based on the component parts connected to the main body;

storing a plurality of connection templates which are described for each of a plurality of configurations of the robot apparatus;

identifying a current configuration based on a comparison between the connection information and the connection templates; and updating configuration dependent software by re-building of the inter-object communication in accordance with the current identified configuration of the robot apparatus.

5. The method according to claim 4 wherein the connection templates are described by adding a label to constituent element information for each of the configurations of the robot apparatus.

6. The method according to claim 4 wherein the label indicates at least a name of the object which is used and a data format type which is used.

* * * * *